United States Patent [19]

Sato et al.

[11] 4,248,529
[45] Feb. 3, 1981

[54] AUTOMATIC IMAGE ORIGINAL HANDLING DEVICE

[75] Inventors: Tadashi Sato, Kokubunji; Katsushi Furuichi, Yokohama, both of Japan

[73] Assignee: Canon Kabushiki Kaisha, Tokyo, Japan

[21] Appl. No.: 29,844

[22] Filed: Apr. 13, 1979

Related U.S. Application Data

[63] Continuation of Ser. No. 899,420, Apr. 24, 1978, abandoned.

[51] Int. Cl.$^3$ ............................................... G03B 27/52
[52] U.S. Cl. .................................. 355/41; 355/14 SH
[58] Field of Search ................... 355/41, 14 C, 14 SH, 355/354; 271/3, 4

[56] References Cited

U.S. PATENT DOCUMENTS

| 4,058,850 | 11/1977 | Sheikh | 355/14 C X |
| 4,126,390 | 11/1978 | Connin | 355/14 C |

*Primary Examiner*—Richard A. Wintercorn
*Attorney, Agent, or Firm*—Fitzpatrick, Cella, Harper & Scinto

[57] ABSTRACT

An automatic image original handling device of a type, in which image originals placed on a plurality of original mounting member capable mounting thereon a plurality of such image originals are forwarded therefrom one by one, the thus sent out image original is conveyed to an original exposure section, and, after the last image original on the particular original mounting member is sent out, an image original on the subsequent original mounting member, the conveyance of which has been subscribed, begins to be forwarded, whereby the image originals are controlled in such a manner that they may be automatically fed out of the plurality of the original mounting member in sequence.

26 Claims, 38 Drawing Figures

FIG. 2
FIG. 3
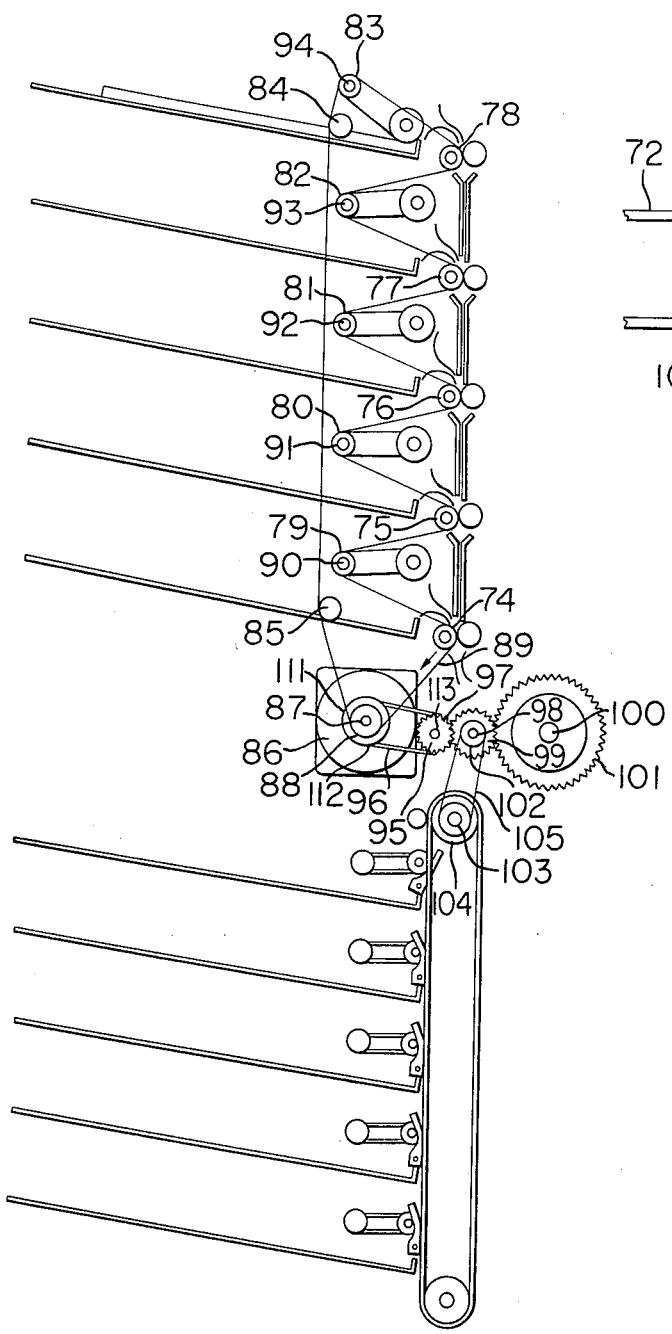
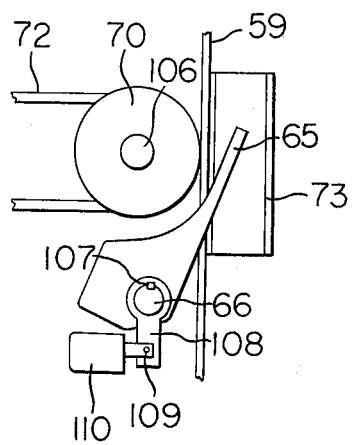

FIG. 6B

| ROW\COL. | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | WR(0) | WA(0) | | | WR(1) | WA(1) | | | WR(2) | WA(2) | | | WR(3) | WA(3) | | |
| 1 | WR(4) | WA(4) | | | WR(5) | WA(5) | | | WR(6) | WA(6) | | | WR(7) | WA(7) | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |

FIG. 10A

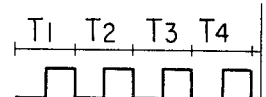

BASIC CLOCK

APPLYING OF THE CONTENT OF REG. PC TO ADDRESS BUS

APPLYING OF ORDER CODES 1-4 OF ROM TO DATA BUS

LATCHING OF DATA BUS SIGNALS TO REG. C

APPLYING OF ORDER CODES 5-8 OF ROM TO DATA BUS

LATCHING OF DATA BUS SIGNALS TO REG. D

DECODING THE CONTENT OF REG. C & D

PROGRAM INSTRUCTION EXCUTING

APPLYING OF DESIGNATION OF RAM I/O TO ADDRESS BUS

APPLYING OF THE CONTENT OF REG. Acc TO RAM. I/O THROUGH THE DATA BUS, AND LATCHING IF TO ADDRESS DESIGNATED BY ADDRESS BUS

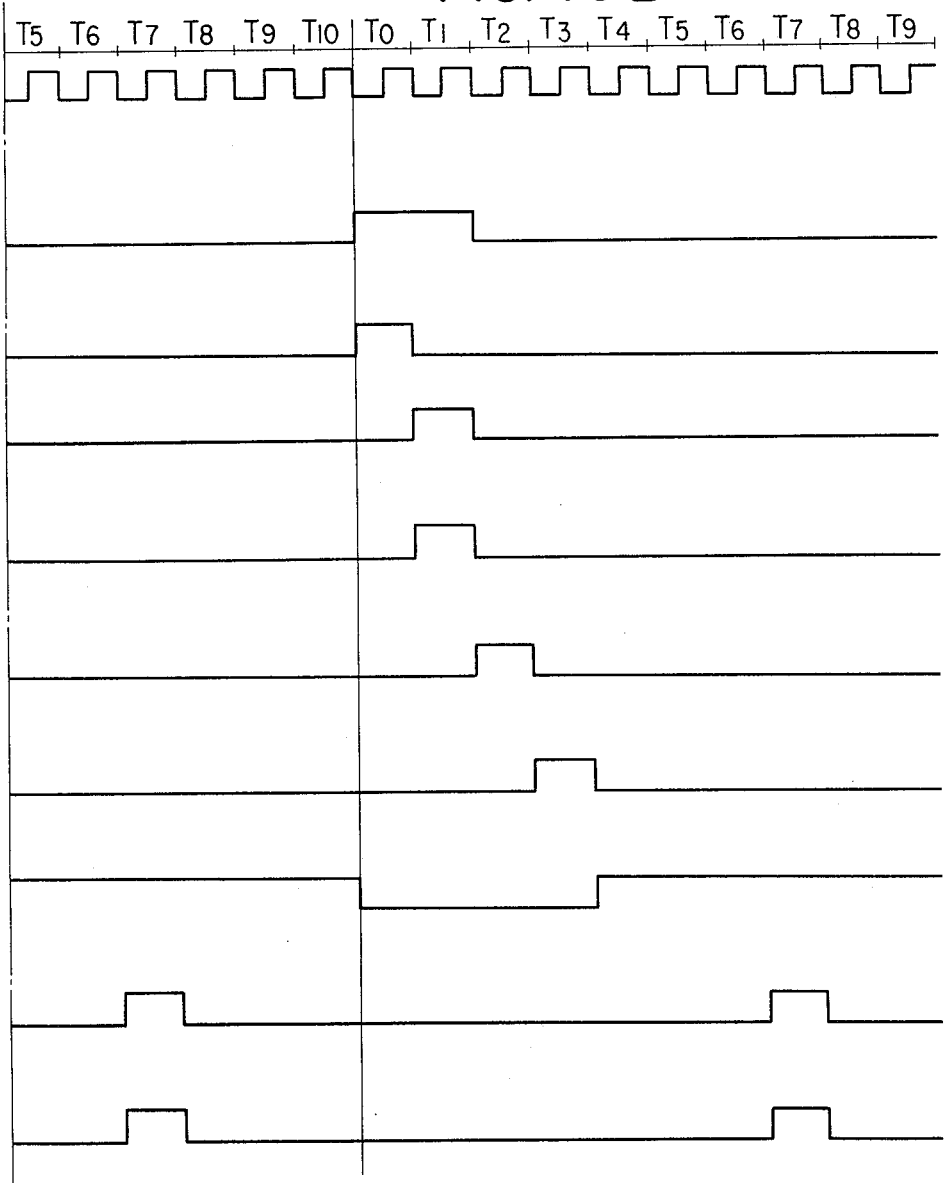
FIG. 10B
FIG. 10
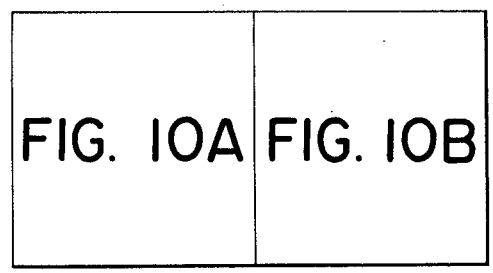

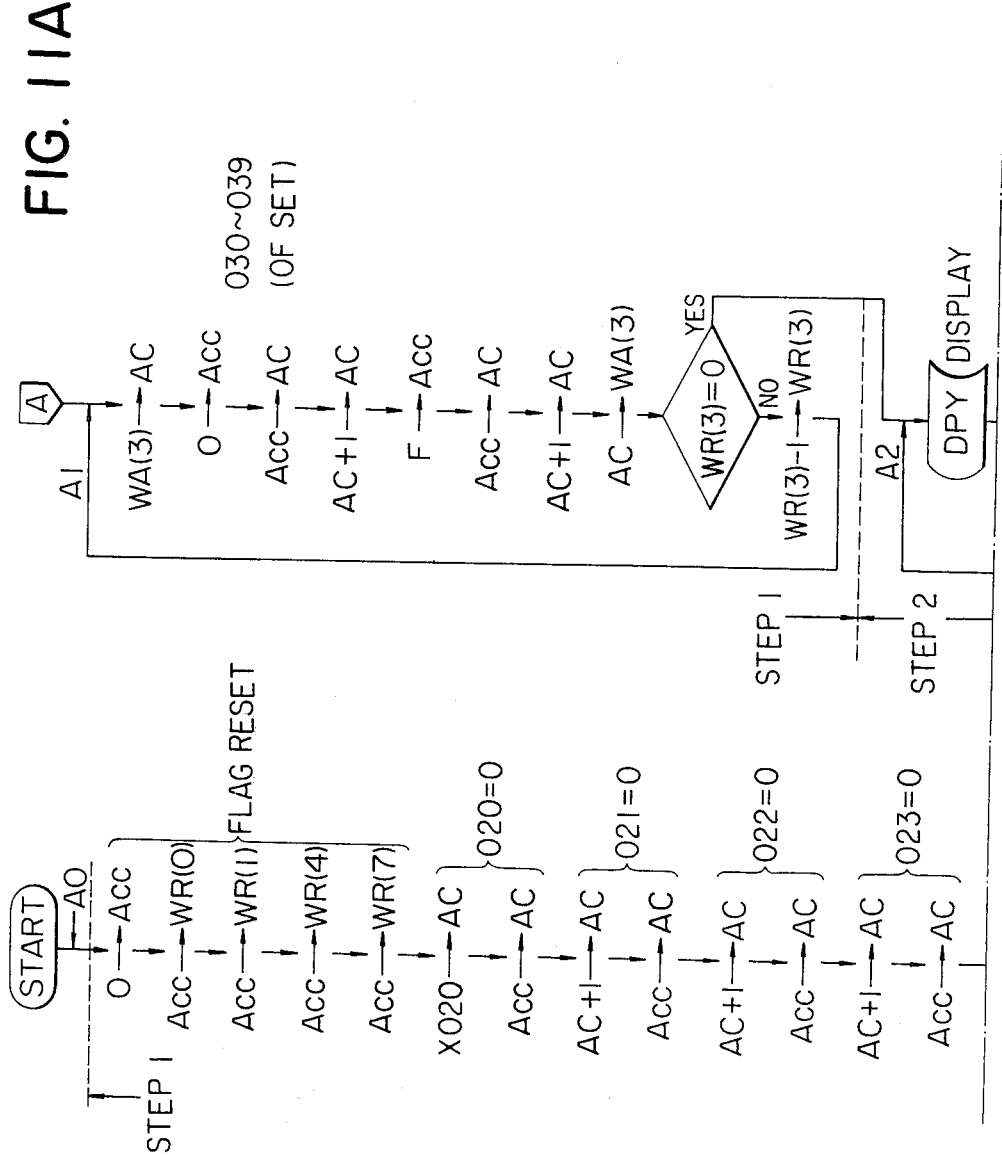

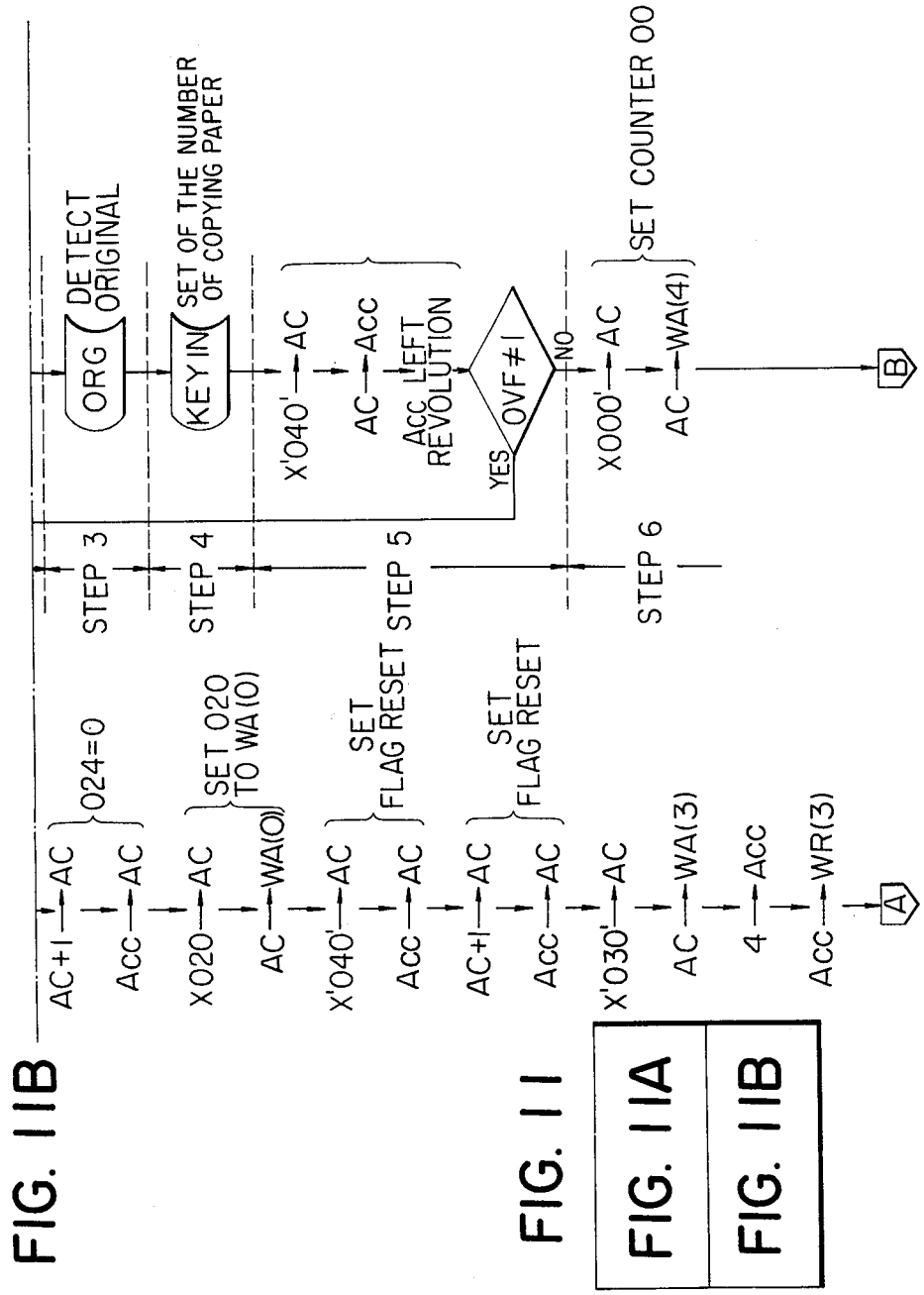

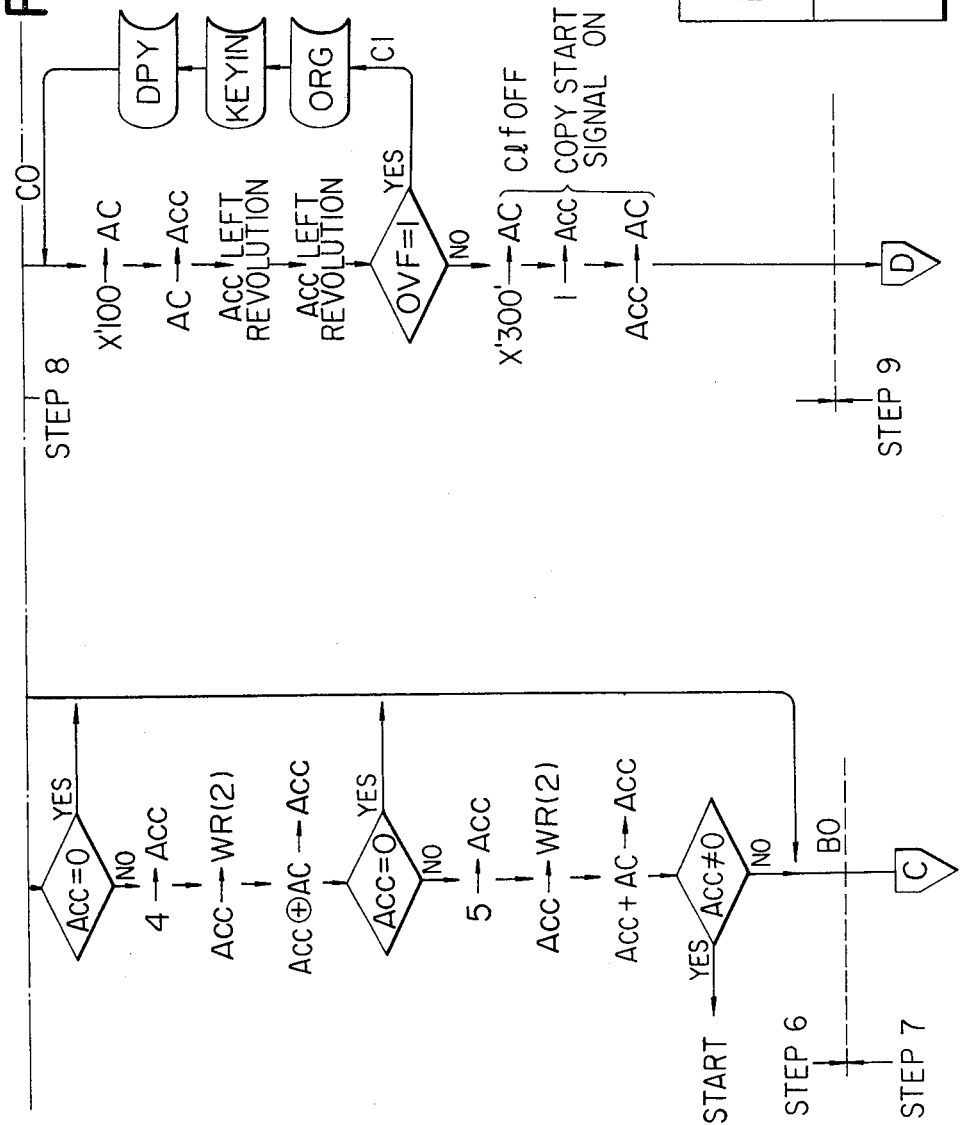

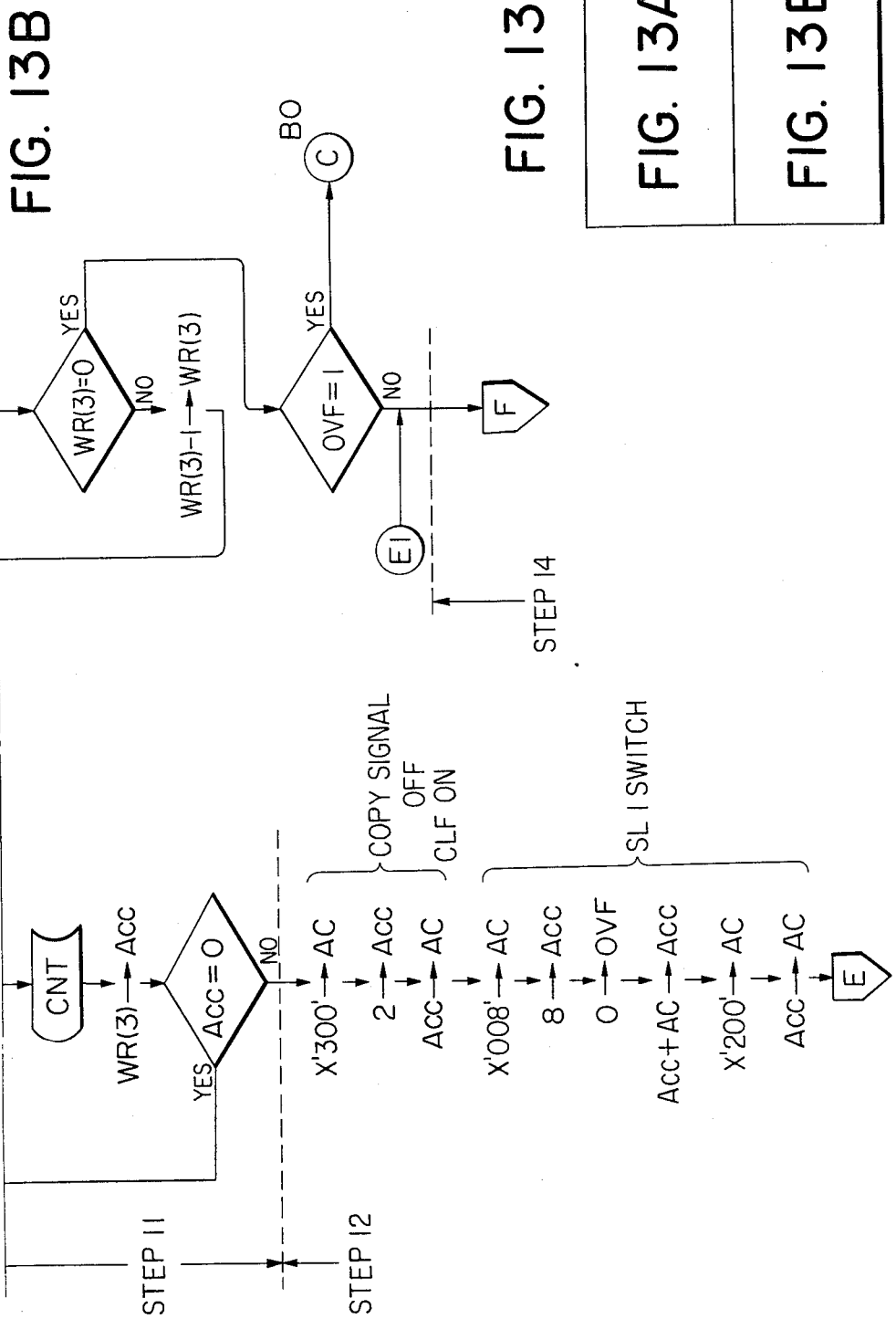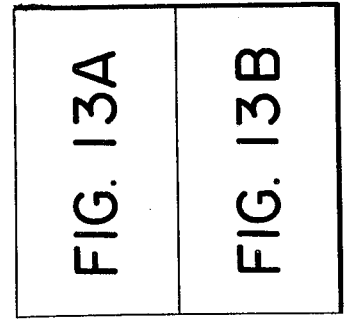

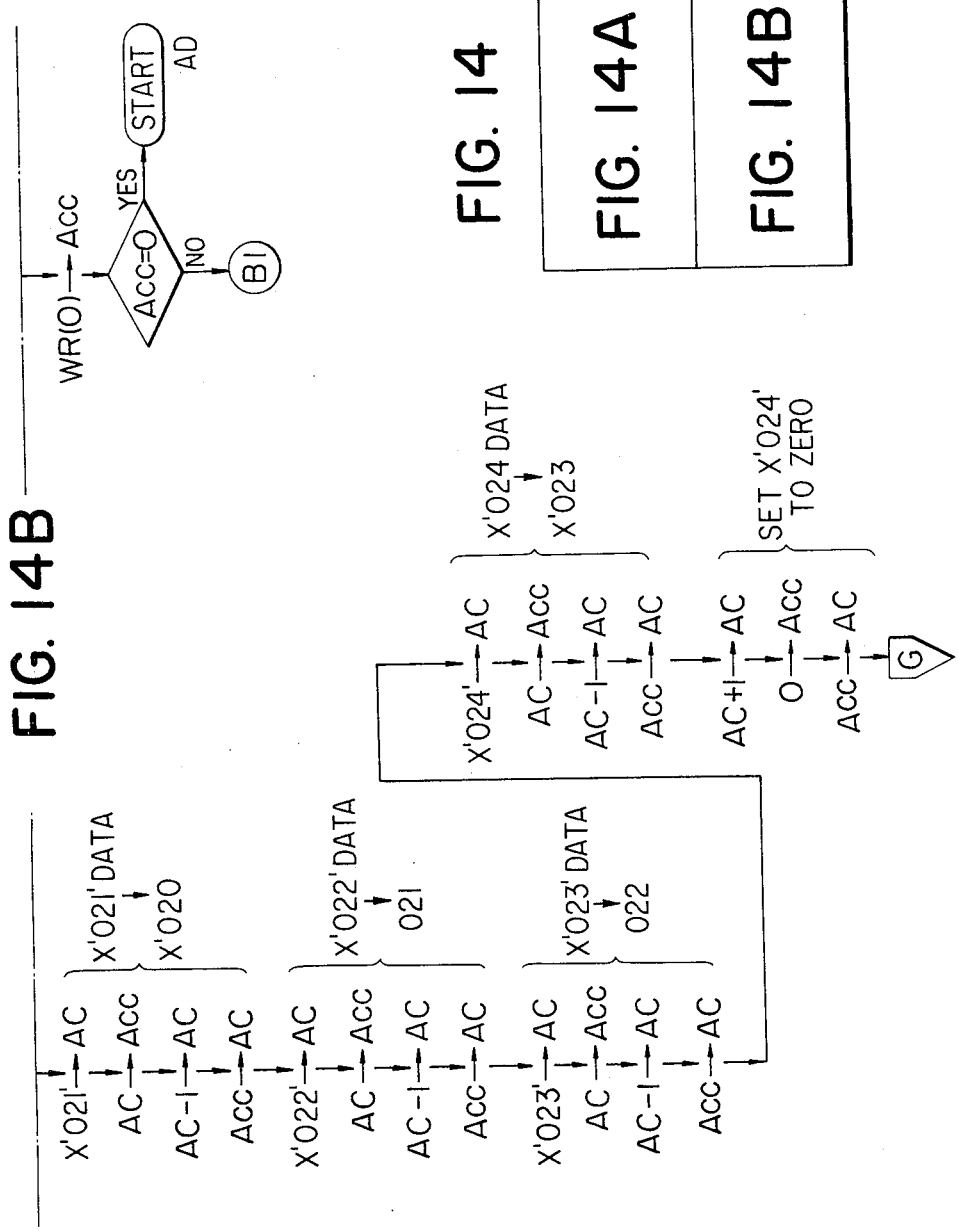

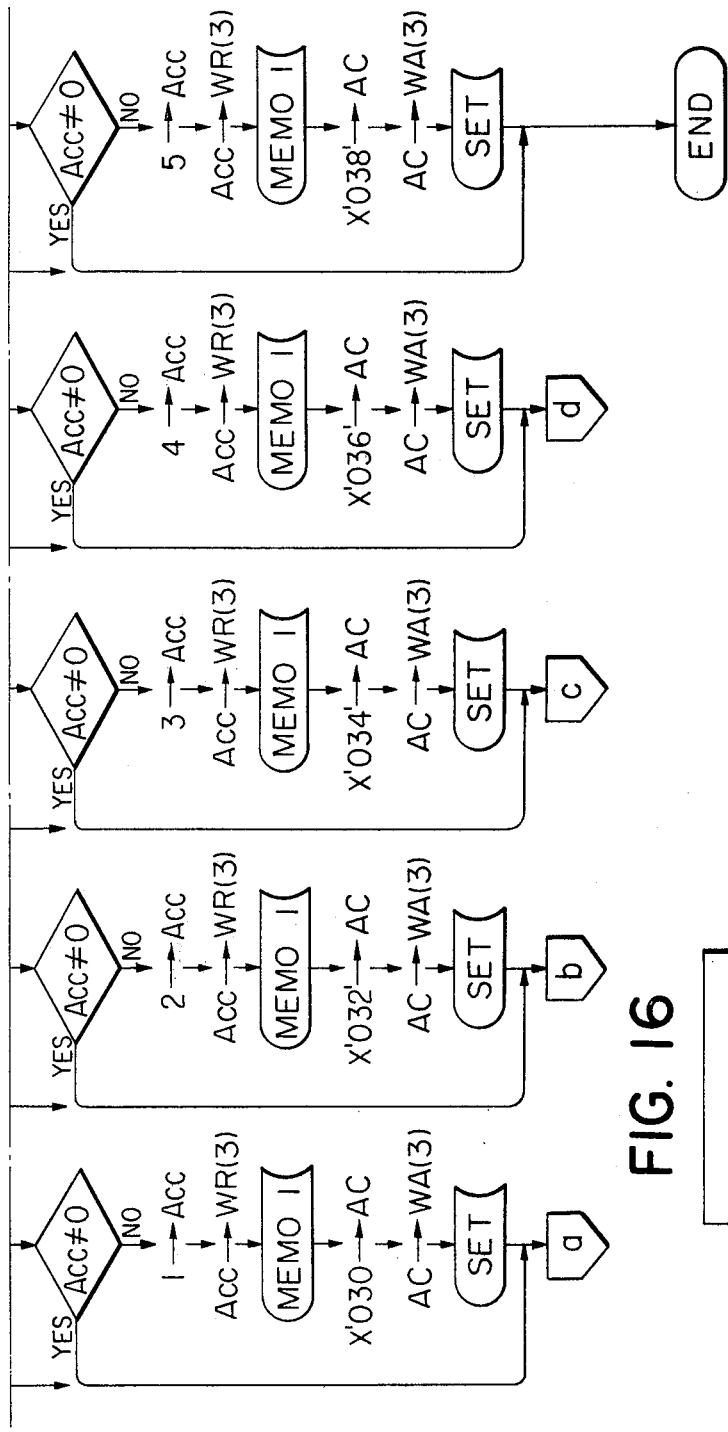

| FIG. 17A |
| FIG. 17B |

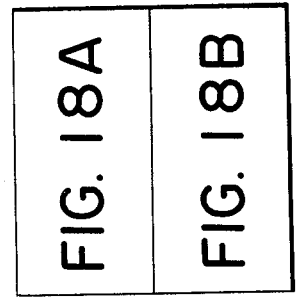
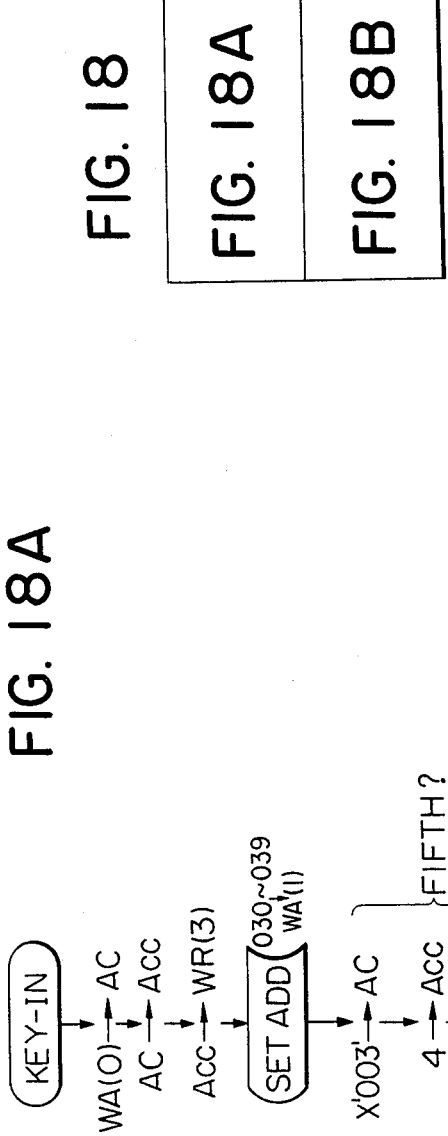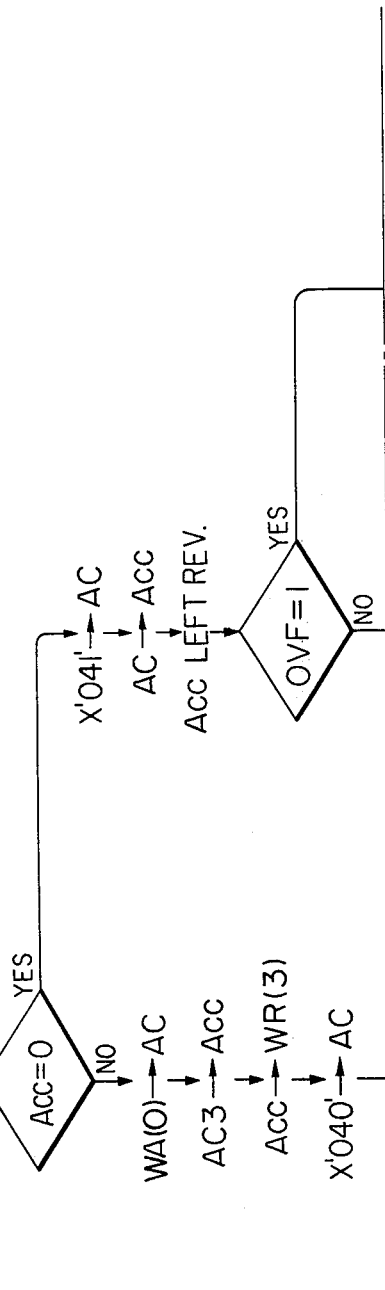

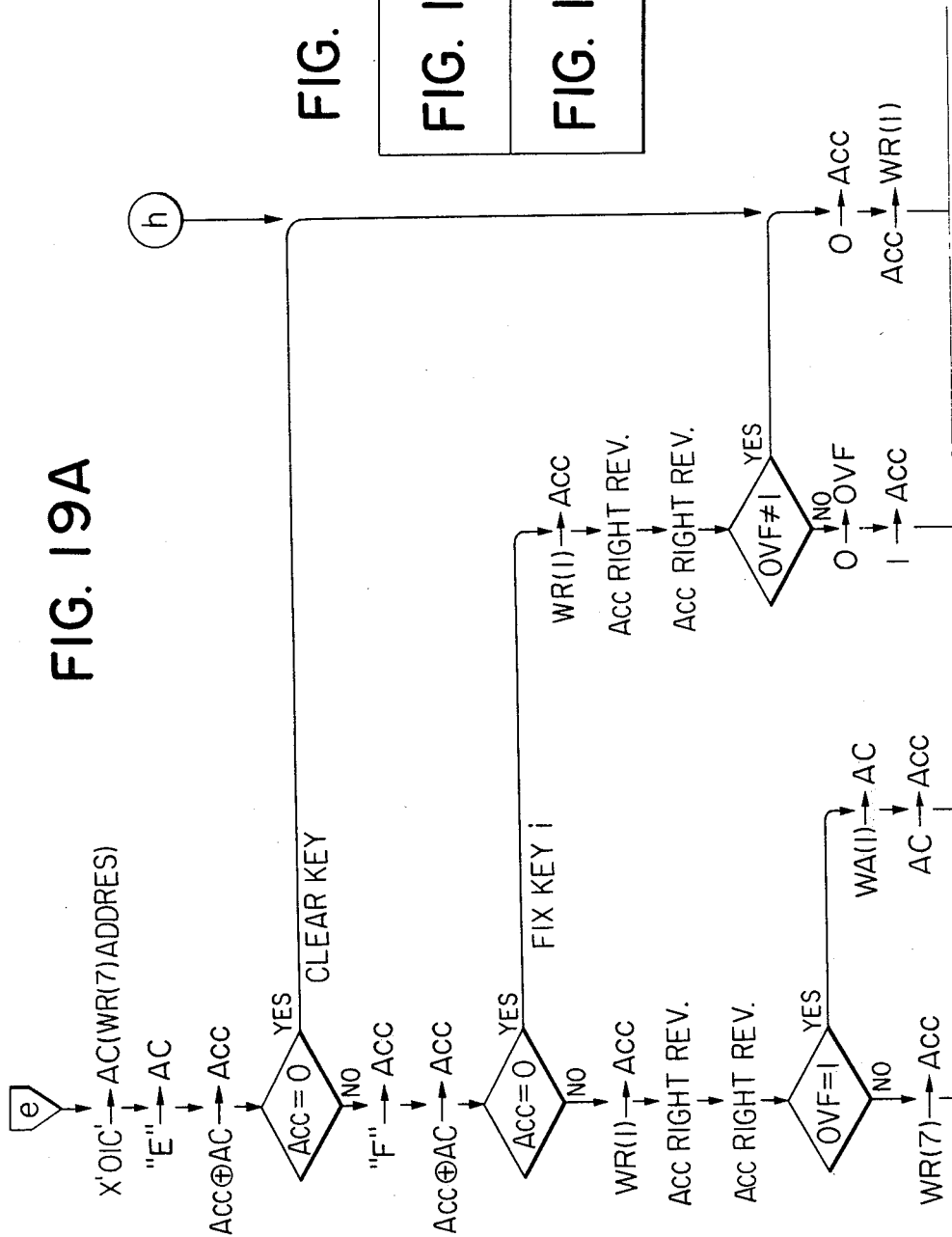

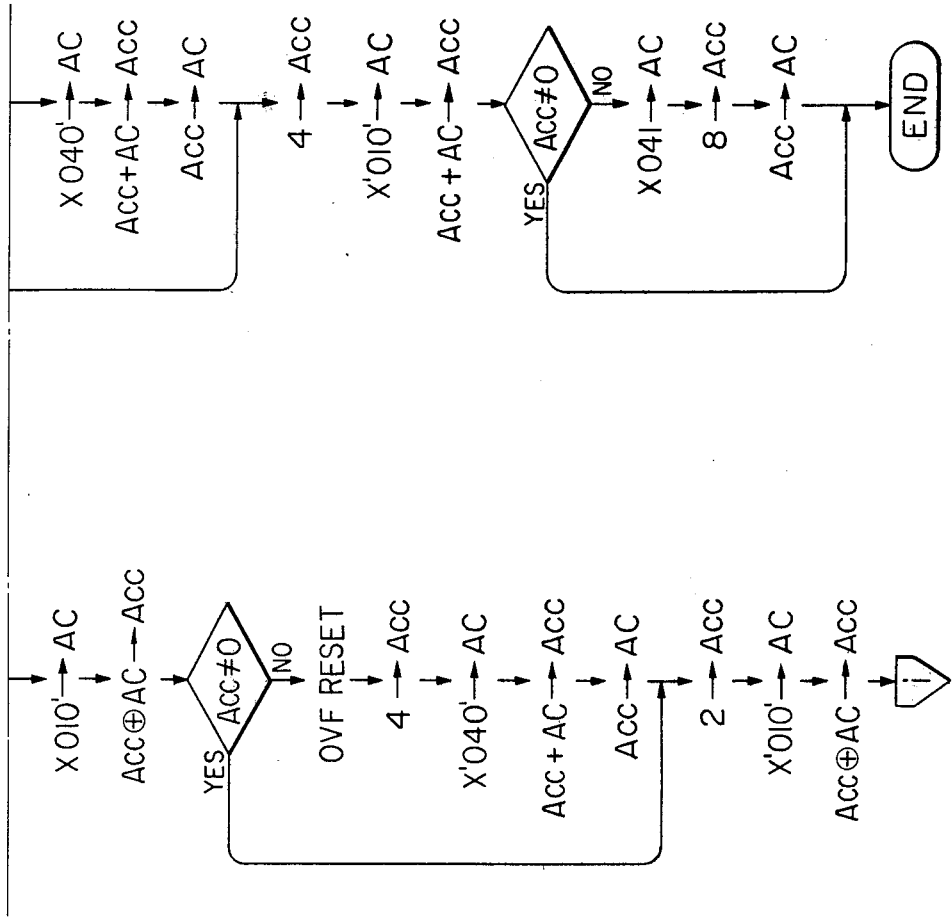

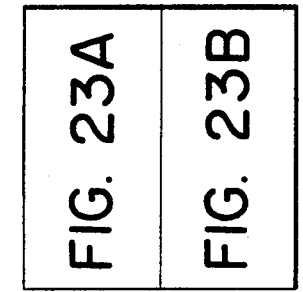
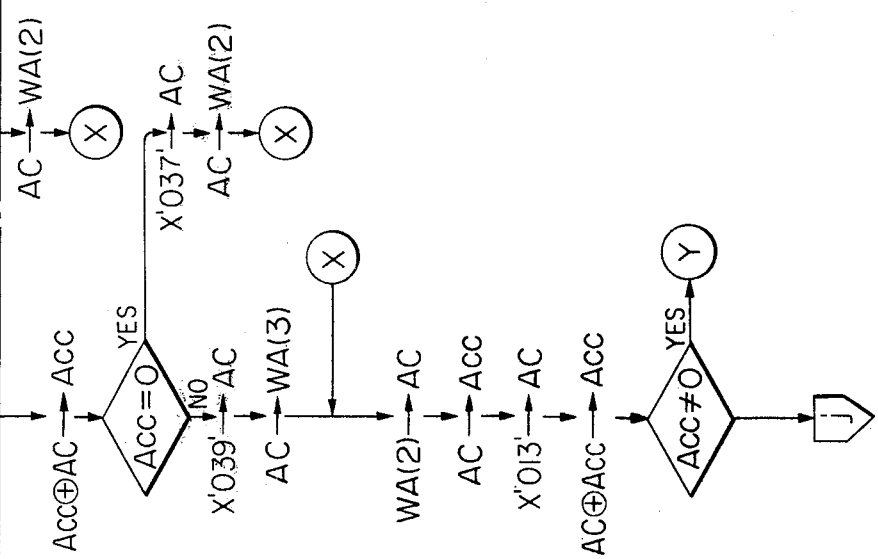

_AUTOMATIC IMAGE ORIGINAL HANDLING DEVICE_

This is a continuation of application Ser. No. 899,420, filed Apr. 24, 1978, now abandoned.

BACKGRROUND OF THE INVENTION a. Field of the Invention

This invention relates to an automatic image original handling device in an image forming apparatus such as reproduction apparatus, etc. which form reproduced images from an image original. In particular, the present invention is concerned with an automatic original handling apparatus of a type, in which the image original is automatically conveyed to an image original exposure section for carrying out exposure operation of the original in the reproduction apparatus, etc. to carry out the optical scanning, etc. necessary for the image formation in the reproduction apparatus, etc., and to automatically remove the original from the reproduction apparatus, etc. after completion of the reproduction operation.

b. Description of the Prior Art

In the heretofore known automatic image original handling devices in the reproduction apparatus, etc., it was not possible for those persons waiting for their turns to use the automatic image original handling device, until the reproduction process of the image original by a previous person before them will be completed. Should there occur such a situation that an image original of the next person is placed in the automatic image original handling device during the reproduction process by the previous person, inconvenience such that only the number of reproduction sheet established by the previous person could be obtained was in most cases unavoidable. Also, in case the next person has to wait for completion of the reproduction operation by the previous person, these who want make copies should be kept waited for a long time in a queue. Apparently, such situation is very inefficient and a waste of time.

SUMMARY OF THE INVENTION

It is therefore a primary object of the invention to provide a very useful automatic image original handling device, from which all these inconveniences are removed. To explain the invention in more detail, a plurality of bins to accommodate therein image originals to be reproduced are provided, and forwarding means is provided in each of the bins to send out the image originals therefrom. With the thus constructed image handling device, the original sent out from the bin is conveyed through a common carrying path to the original exposure section in the reproduction apparatus, etc. for image formation, and, after the required image formation for the reproduction is completed by means of an exposure device such as an optical scanning device, etc., the image original is returned to image original receiving bins corresponding to the respective original placing bins. In this automatic image original handling device, when a first operator places an image original in the original placing bin and instructs necessary reproduction conditions to a reproduction sheet number setting device, etc. for the particular original placing bin, the reproduction operations become ready, and the operator can start the reproduction operations. During this reproduction operations by the first operator, those persons waiting for their turn after the second et seq. may place their image originals in separate image placing bins and set the necessary reproduction conditions such as setting of the desired number of reproduction sheet, etc. in the reproduction sheet number setting device. In so doing, no sooner the reproduction operation of the first operator completes than the reproduction operations of the second operator start automatically.

The "reproduction conditions" as used herein are changeable at every time the original placing bins accommodating therein the necessary image originals are changed from one to the other in accordance with stored operating data such as the number of reproduction sheet per image original, reproduction density, reproduction magnification, and so forth, all of which are stored in correspondence to each of the original placing bins, so that the reproduction conditions set in each bin may be changed to effect the reproduction operations in the order as established.

Thus, according to the present invention, it is possible for the second et seq. operators to subscribe for the reproduction under desired reproduction conditions, even when previous operator is carrying on the reproduction operations.

It is another object of the present invention to provide an automatic image original handling device which is capable of presetting the reproduction conditions to each image original placed on a plurality of original mounting sections capable of accommodating therein a plurality of image originals.

It is still another object of the present invention to provide an automatic image original handling device which is capable of presetting the reproduction conditions to each image original placed on a plurality of original mounting sections which can accommodate therein a plurality of image originals, and which executes the reproduction conditions to the image original in the subsequent original mounting section when reproduction of the image original placed on a particular original mounting section is completed.

It is other object of the present invention to provide an automatic image original handling device which is capable of presetting the reproduction conditions to each image original placed on a plurality of original mounting sections which can accommodate therein a plurality of image originals, and which can render the respective reproduction conditions visible.

It is still other object of the present invention to provide an automatic image original handling device which performs setting of the reproduction conditions to each of the plurality of image originals in the sequence of their placement on the original mounting sections.

It is further object of the present invention to provide an automatic image original handling device which performs setting of the reproduction conditions to each of the plurality of the image originals placed on a plurality of the original mounting sections capable of accommodating therein the plurality of image originals by first detecting the sequence of placement of the originals in the original mounting section, and in accordance with such detected sequence.

It is still further object of the present invention to provide an automatic image original handling device capable of notifying completion of setting of the reproduction conditions for each of a plurality of image originals.

It is still further object of the present invention to provide an automatic image original handling device capable of effecting reproduction for each of the image originals placed on each of a plurality of original mounting sections capable of accommodating therein a plurality of image originals in accordance with the sequence of placement of the plurality of image originals.

It is still further object of the present invention to provide an automatic image original handling device which is capable of accommodating each of the plurality of image originals into the respective original receiving sections after completion of the reproduction operations for each image original placed on the plurality of image mounting sections capable of accommodating therein a plurality of image originals.

It is still further object of the present invention to provide an automatic image original handling device which is capable of notifying placement of the image originals on the original mounting sections, when the image originals are placed on a plurality of original mounting sections capable of accommodating therein a plurality of image originals.

It is still further object of the present invention to provide an automatic image original handling device which is capable of notifying the sequence of reproduction for each of the plurality of image originals.

It is still further object of the present invention to provide an automatic image original handling device which is capable of starting reproduction of the subsequent image original in response to completion of the reproduction for the previous image original.

It is still further object of the present invention to provide an automatic image original handling device which is capable of setting the reproduction conditions for each of the image originals placed on the original mounting sections capable of mounting thereon a plurality of image originals, and which is capable of clearing the reproduction conditions for each of such image originals in response to presence or absence of the image originals on the original mounting sections, or in response to completion of execution of the reproduction conditions.

It is still further object of the present invention to provide an automatic image original handling device capable of setting the reproduction conditions for image originals placed on other original mounting sections, while the image originals are placed on a plurality of original mounting sections capable of accommodating therein a plurality of image originals, and the reproduction operations are being conducted for an original placed on one of such original mounting sections.

It is still further object of the present invention to provide an automatic image original handling device which is capable of setting the reproduction conditions to each of a plurality of image originals, wherein setting of the reproduction conditions for other image originals, can be effected while reproduction operations are being conducted for a certain image original.

The foregoing objects, other objects are well as the detailed construction and operations of the automatic image original handling device according to the present invention will become more apparent from the following explanations of the constructions and operations of the preferred embodiments of the device, when read in conjunction with the accompanying drawing.

BRIEF DESCRIPTION OF THE DRAWINGS

FIG. 2 is a cross-sectional view showing a driving section of the automatic image original handling device of the present invention;

FIG. 3 is an enlarged cross-sectional view showing an original receiving section of the device;

FIG. 6A and 6B are an explanatory diagram of the contents of "RAM" section of the control unit shown in FIG. 4;

FIG. 10A and 10B is a basic timing chart;

FIGS. 11A, 11B, 12A, 12B, 13A, 13B, 14A, 14B, 15, 16A, 16B, 17A, 17B, 18A, 18B, 19A, 19B, 20, 21, 22A, 22B, 23A and 23B are respectively diagrams for explaining the sequence controls.

DETAILED DESCRIPTION OF PREFERRED EMBODIMENTS

The present invention will now be explained in detail in reference to FIGS. 1 to 3 of the accompanying drawing.

Figure 1:
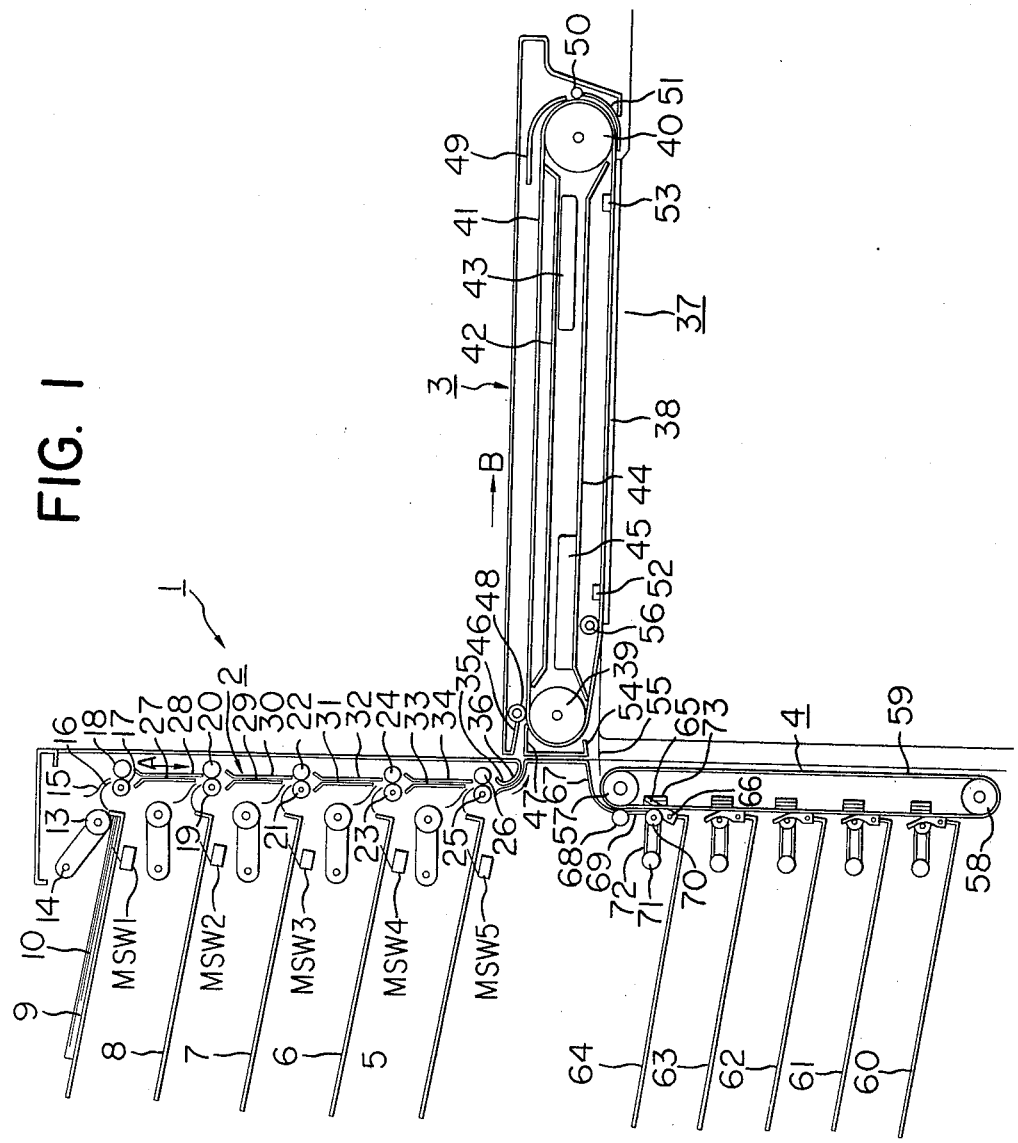
FIG. 1 is a cross-sectional view showing the automatic image original handling device according to the present invention.

In FIG. 1, a reproduction requisition device 1 includes an image original mounting section 2, an image original conveying section 3, and an image original receiving section 4.

The image original mounting section 2 is provided with a plurality of original mounting bins 5, 6, 7, 8 and 9, each being capable of accommodating therein the image originals.

When an image original 10 is placed on the original mounting bin 9, an image original detecting microswitch MSW1 is actuated, whereby the number of reproduction sheet of the image original 10 placed on the original mounting bin 9 can be instructed to a copy counter by means of a copy selector provided in the reproduction apparatus, etc. This electrical sequence will be described in detail at later paragraphs.

When the image original detecting microswitch MSW1 is actuated, a pick-up roller 13 positioned above the image original lowers down on the surface of the topmost image original 10 with a rotational shaft 14 thereof as the pivot, whereby the image original 10 becomes conveyable. The rotational shaft 14 and the pick-up roller 13 are linked by a belt, etc. (not shown). The rotation of the shaft 14 in accordance with a particular signal causes the image originals 10 on the original mounting bin 9 to be sent out one by one from the topmost, and is conveyed in the direction of an arrow mark A through guide plates 15, 16 and rollers 17, 18. In other words, the image original 10 is fed out of the original mounting section 2 and conveyed sequentially through the guide plates 15, 16, rollers 19, 20, guide plates 29, 30, a driving roller 21, a roller 22, guide plates 31, 32, a driving roller 23, a roller 24, guide plates 33, 34 a driving roller 25, a roller 26, and exit guide plates 35, 36.

The same operations can be applied to the remaining original mounting bins 5, 6, 7 and 8.

The original conveying section 3 is so constructed that it may receive the image original for the reproduction apparatus, etc. 37 on its original mounting glass table 38 where optical scanning and other related operations are carried out.

Original receiving bins 60, 61, 63 and 64 are further provided in correspondence to the respective original mounting bins 5, 6, 7, 8 and 9. That is, the image original 10 mounted on the original mounting bin 9 is forwarded to the original receiving bin 60 after it has accomplished its desired objective in the original conveying section 3. That is to say, the image original 10 which has passed through a path formed by a guide plate 67, a roller 68 and a conveyor belt 59 is guided to the original receiving bin 60 by the rotation of a guide lever 65 with a lever shaft 66 as a pivot through the action of a plunger, as shown in the drawing.

A belt 72 extended between pulleys 70 and 71 is for sending the image original 10, in particular, the rear end portion thereof, smoothly to the original receiving bin 60.

The pulley 70 rotates in a manner to urge the conveyor belt 59. In this case, by positioning a belt urging plate 73 at the back side of the conveyor belt 59, in confrontation to the pulley 70, it becomes able to press the conveyor belt 59 under an appropriate pressure.

The driving system for this device will now be described hereinbelow in reference to FIG. 2. A sprocket 88 is fixedly provided on a motor shaft 87 of a driving motor 86. A chain 89 engaged with this sprocket 88 is driven by way of a sprocket 74 fixedly provided on a driving roller 25, a sprocket 79 fixedly provided on a shaft 90, a sprocket 75 fixedly provided on a driving roller 23, a sprocket 80 fixedly provided on a shaft 90, a sprocket 76 fixedly provided on a driving roller 21, a sprocket 81 fixedly provided on a shaft 92, a sprocket 77 fixedly provided on a driving roller 19, a sprocket 82 fixedly provided on a shaft 93, a sprocket 78 fixedly provided on a driving roller 17, a sprocket 83 fixedly provided on a shaft 94, and freely rotatable idler sprockets 84 and 85. In this manner, the original mounting section can be driven.

The original conveying section 3 is constructed in a manner as described below. A sprocket 111 is fixedly provided on the motor shaft 87, and a sprocket 95 is fixedly provided on a rotatable shaft 113. A chain 96 is extended over these sprockets. Further, a gear 97 is fixedly provided on the rotatable shaft 113, and a gear 99 is fitted on a shaft 98 so as to be meshed with this gear 97. Finally, a conveyor belt 41 made of a rubber material is extended over a roller 39 provided on a shaft 100 and a roller 40 in a meshing relationship with the gear 99. A partition plate 42 is fixed on the inside of the conveyor belt 41, the interior of which constitute a suction box due to the action of a suction fan 43. Further, another partition plate 44 is fixed on the lower side of the conveyor belt 41 in the same manner as the above-mentioned partition plate 42, the interior of which also constitutes a suction box due to the action of a suction fan 45.

The image original sent out of the original mounting section 2 is conveyed, in an arrowed direction B, on the conveyor belt 41 through the guide plates 46, 47 and through a pressure roller 48 urged by the conveyor belt 41. The image original passes through a path between the conveyor belt 41 and a guide plate 49, and through a roller 50 and a guide plate 51 to reach the original mounting glass table 38, where the conveyor belt 41 stops its movement by release of an electromagnetic clutch, etc. (not shown) through a paper edge detecting device 52. Upon completion of the image forming process to obtain a desired reproduction image by detection of a scanning completion detecting device 53 for the image formation such as optical scanning of the reproduction apparatus, etc., the image original is discharged from the original conveying section 3 through exit guides 54 and 55 so that the subsequent image original may be replaced.

A roller 56 inside the conveyor belt 41 is for smooth discharge of the image original from the original conveying section 3.

Incidentally, provision of a multitude of suction holes in the conveyor belt 41 provides very favorable conveying force when the image original reaches the lower side of the belt, i.e., the original mounting glass table 38. However, when the image original is small in size with respect to reproduction paper, on which it is to be reproduced, the holes are liable to be reproduced on the marginal portion of the reproduction paper. It is therefore necessary that such holes be provided in the minimum possible number which does not reduce any effective conveyance of the paper in consideration of the abovementioned point.

The image original receiving section 4 is constructed in a manner as described hereinbelow. That is, another conveyor belt 59 is extended over rollers 57 and 58, a gear 101 is fixedly provided on the shaft 100 to drive the original conveying section 3, a sprocket 102 is fixedly provided on the shaft 98 and another sprocket 104 is fixedly provided on a shaft 103 of the roller 57, and a chain 105 is extended over these sprockets for driving the sprocket 104.

Explaining now a guide lever for this original receiving section 4, a pulley 70 is fixedly provided on a shaft 106 which is urged by the conveyor belt 59. A guide lever 65 and a solenoid lever 108 are fixedly provided on a shaft 66 at a position of a key 107 as shown in FIG. 3. The solenoid lever 108 is connected to a solenoid 110 by means of a pin 109. By the action of the solenoid 110, the solenoid lever 108 moves as shown in the drawing.

In the following, a control circuit for carrying out these operation will be described. It should be noted that this circuit may be provided either in the reproduction apparatus per se, or in the reproduction requisition device 1. The explanations in the following will be made on a case requisition device 1.

Figure 4A:
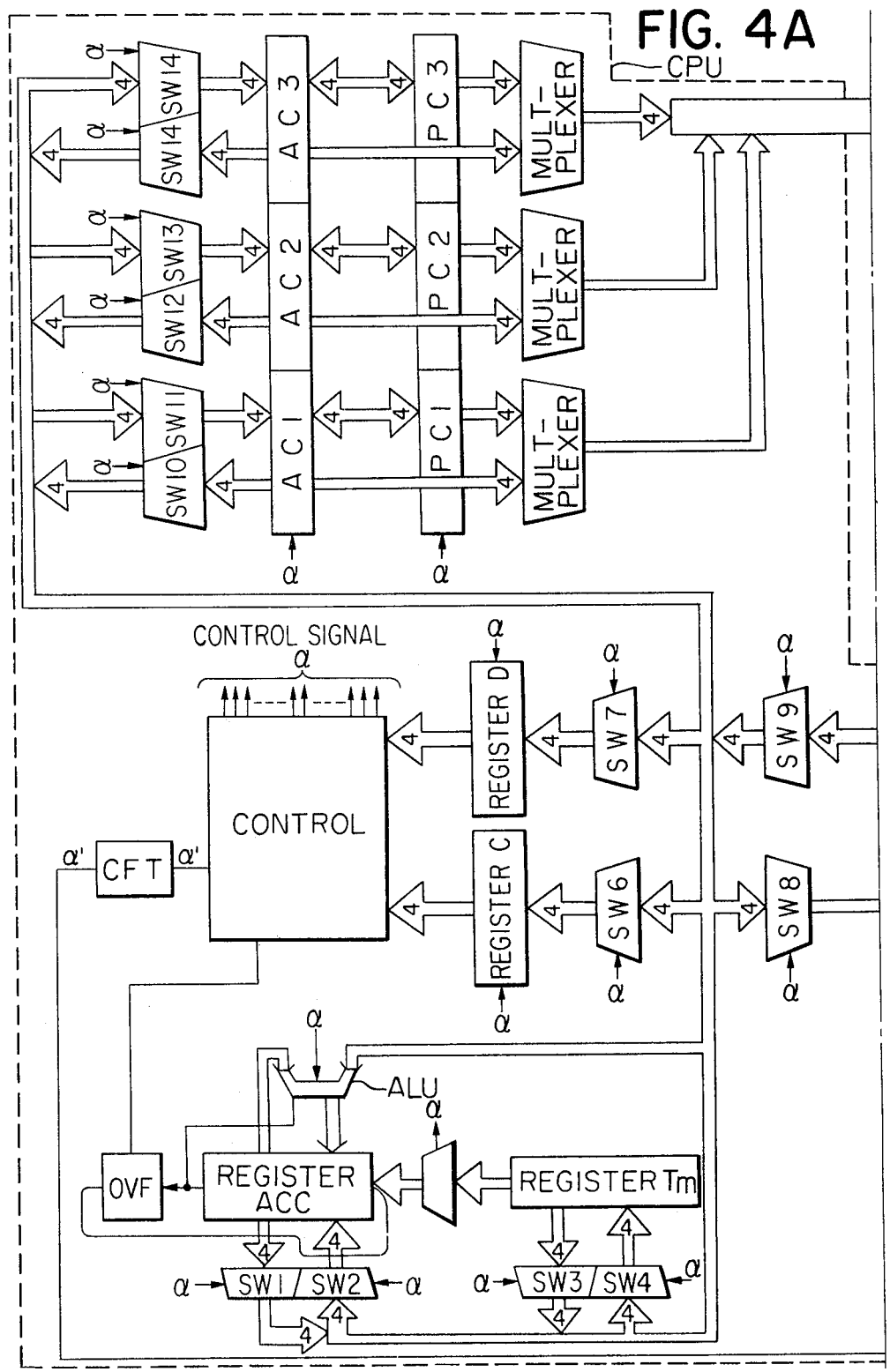
FIG. 4A and 4B is a block diagram of a control unit in the automatic image original handling device of the present invention
Figure 4B:
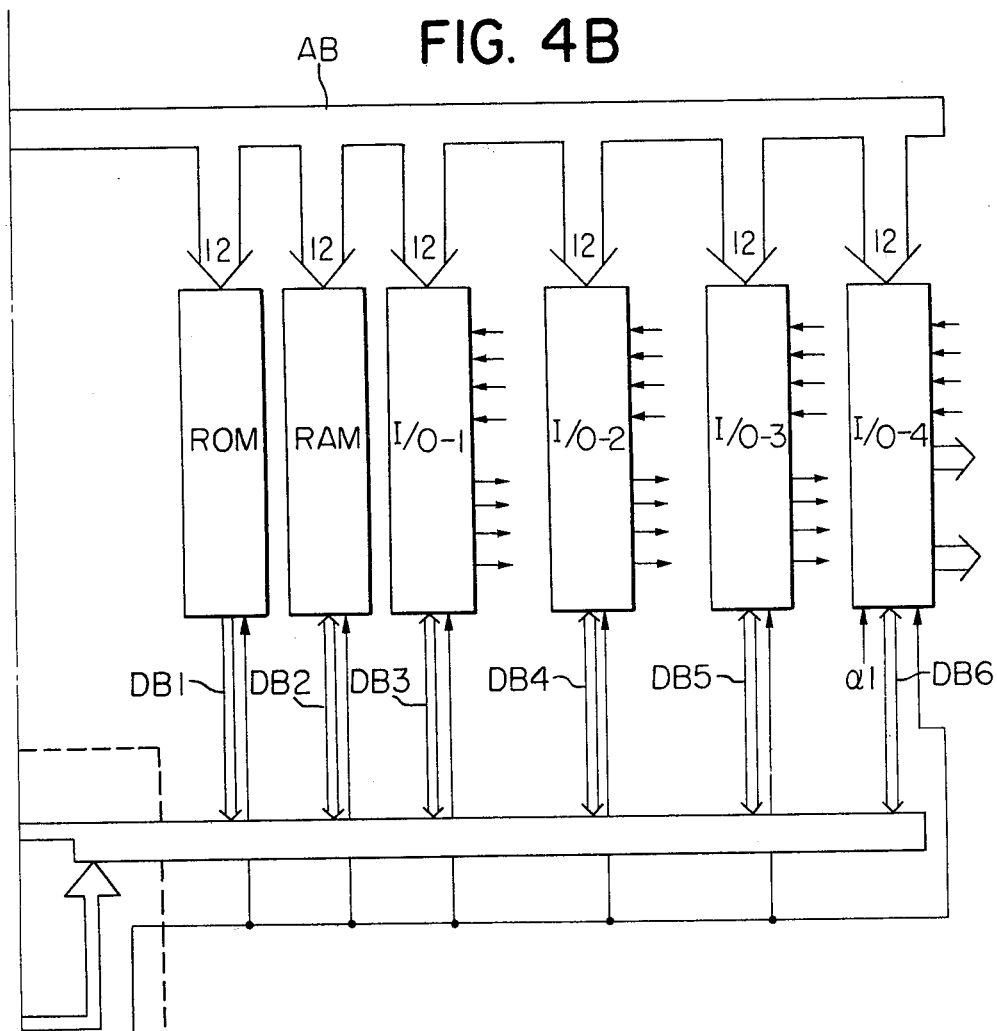
Figure 4:
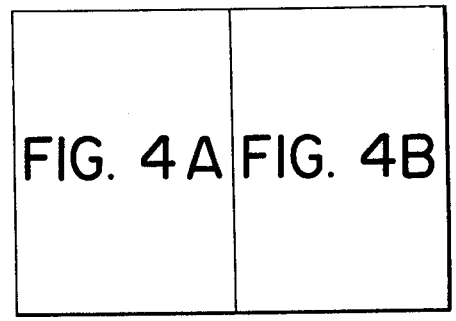
Figure 5:
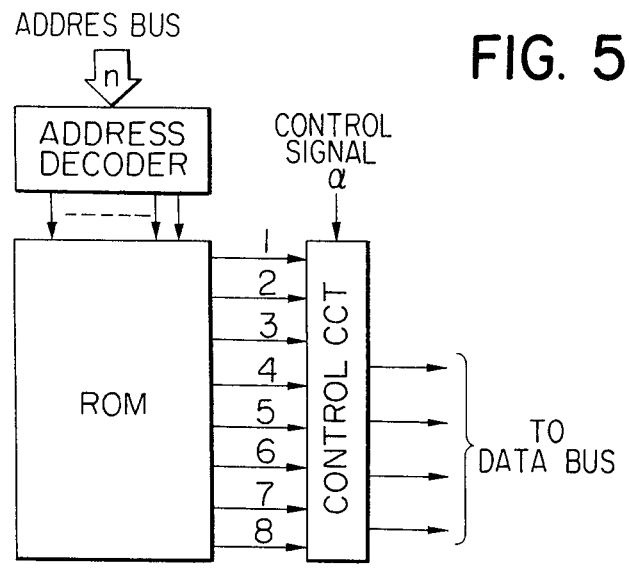
FIG. 5 is a block diagram showing a "ROM" section of the control unit shown in FIG. 4.

FIG. 4 is a block diagram for the control device. In the drawing, ROM designates a memory exclusive for read-out operation, in which the sequence contents of the automatic image original handling device is pre-established in the designated order so that the sequence contents may be taken out at every time when they are incorporated in the addresses for establishment of such addresses. Details of this memory is shown in FIG. 5. That is, the memory itself stores therein control contents (including not only the operating outputs of the apparatus, but also the control contents of the other circuits) in the form of 8-bit binary codes in the order of an address 0 to a required ultimate address to be pre-established with codes in the known matrix circuit.

Figure 6A:
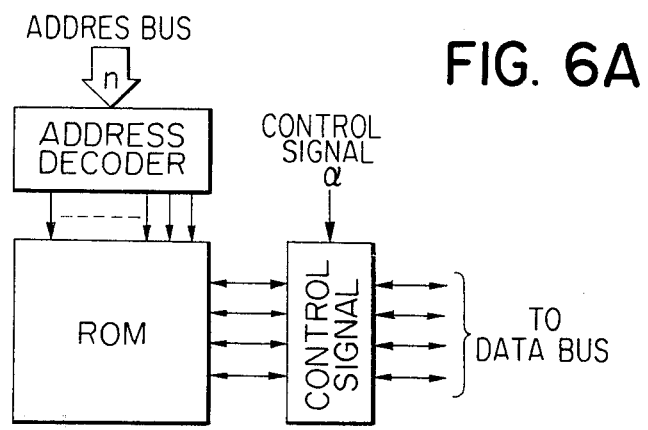
FIG. 6A is a block diagram of a "RAM" section of the control unit shown in FIG. 4.

RAM refers to a memory for both read-out and write-in operations, which stores therein the number of reproduction sheet and a temporary control signal during the process control. The memory is constructed with a set of a memory for storing therein binary codes (details being shown in FIGS. 6A and 6B) and a plurality of memory cells, and a plurality of the sets are combined together. An arbitrary set is selected by an address designating signal, into and out of the plurality of memory cells of which the data are written or read. In FIG. 6B, the memory address is represented in the form of, for example, "XO31", the numeral in the lower first place denoting a column, and the numerals in the higher two places denoting a row. "XO31" can accommodate therein 4-bit data. In this case, the data of the lower first place of the number of copy sheet with respect to the original mounting bin 9 are accommodated.

Figure 7:
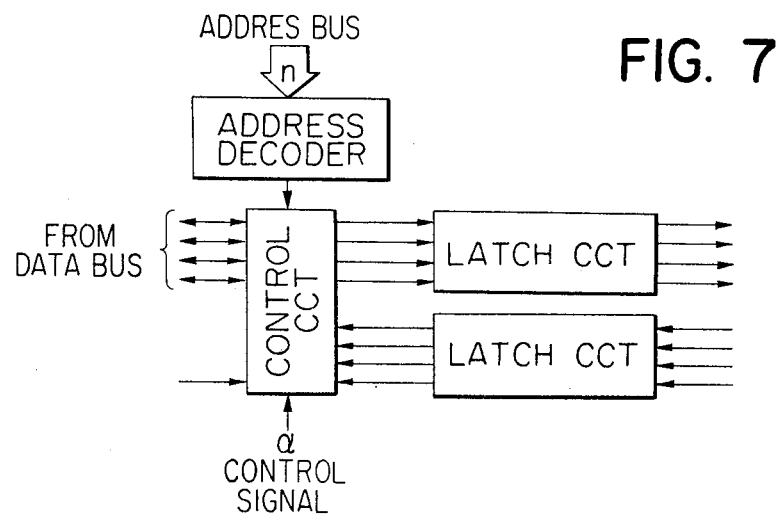
FIG. 7 is a block diagram showing input-output units I/O-1, . . . I/O-3 of the control unit shown in FIG. 4.

I/O-1 I/O-2 and I/O-3 designate respectively input and output units, which generate data input signals to notify whether the image originals are placed on the bins, and whether copies have been made, or not, or signals for driving clutch and solenoid for feeding the image original. The details of the unit are shown in FIG. 7.

Figure 8:
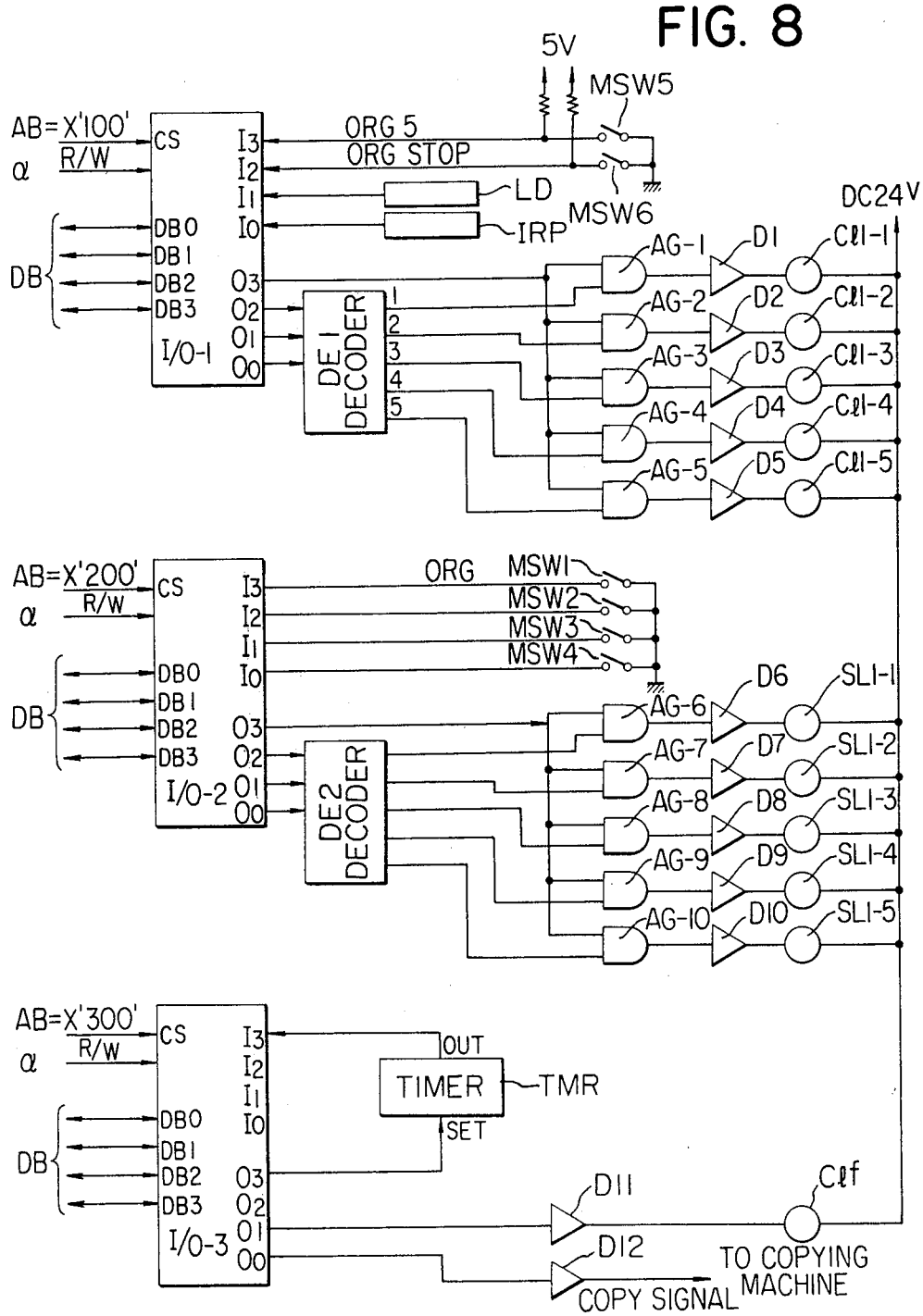
FIG. 8 is an external connection diagram of the input-output units I/O-1 to I/O-3.

FIG. 8 is a diagram showing the connections among the input-output units I/O-1, I/O-2 and I/O-3 and the surrounding circuits thereabout. In the drawing, MSW1 to MSW5 respectively designate microswitches for detecting means which detect whether the image originals are placed in the original mounting bins 9 to 5, or not. The detection may of course be carried out optically. MSW6 is also a microswitch to detect whether the image original has arrived at a predetermined position, or not.

LD designates a detector which detects, for example, light for the exposure process for counting the number of copy sheet. IRP also designates a detector which detects interruption signals, by the detection of which other processes are carried out. DE1 refers to a decoder which decodes an output from the input-output unit I/O-1, and actuates the pick-up roller shown in FIG. 1 for sending out the image original mounted on the original mounting bins 5 to 9. For instance, in case the image original is on the bin 9, the pick-up roller 13 is actuated. DE2 designates a decoder which decodes an output from the input-output unit I/O-2, and drives the solenoids SL-1 to SL-5 of the plunger which drives the guide the image original to the original receiving bias 60 to 64. The solenoid SL-1 actuates the guide 65. TMR refers to a timer which is actuated by a signal from the input-output unit I/O-3, and returns the signal to the input-output unit I/O-3 after a predetermined time lapse. A symbol c1-f designates a clutch to control conveyance of the image original in the original conveying section 3. Further, the input-output unit I/O-3 sends a copy signal from a terminal Io to the reproduction apparatus.

Figure 9:
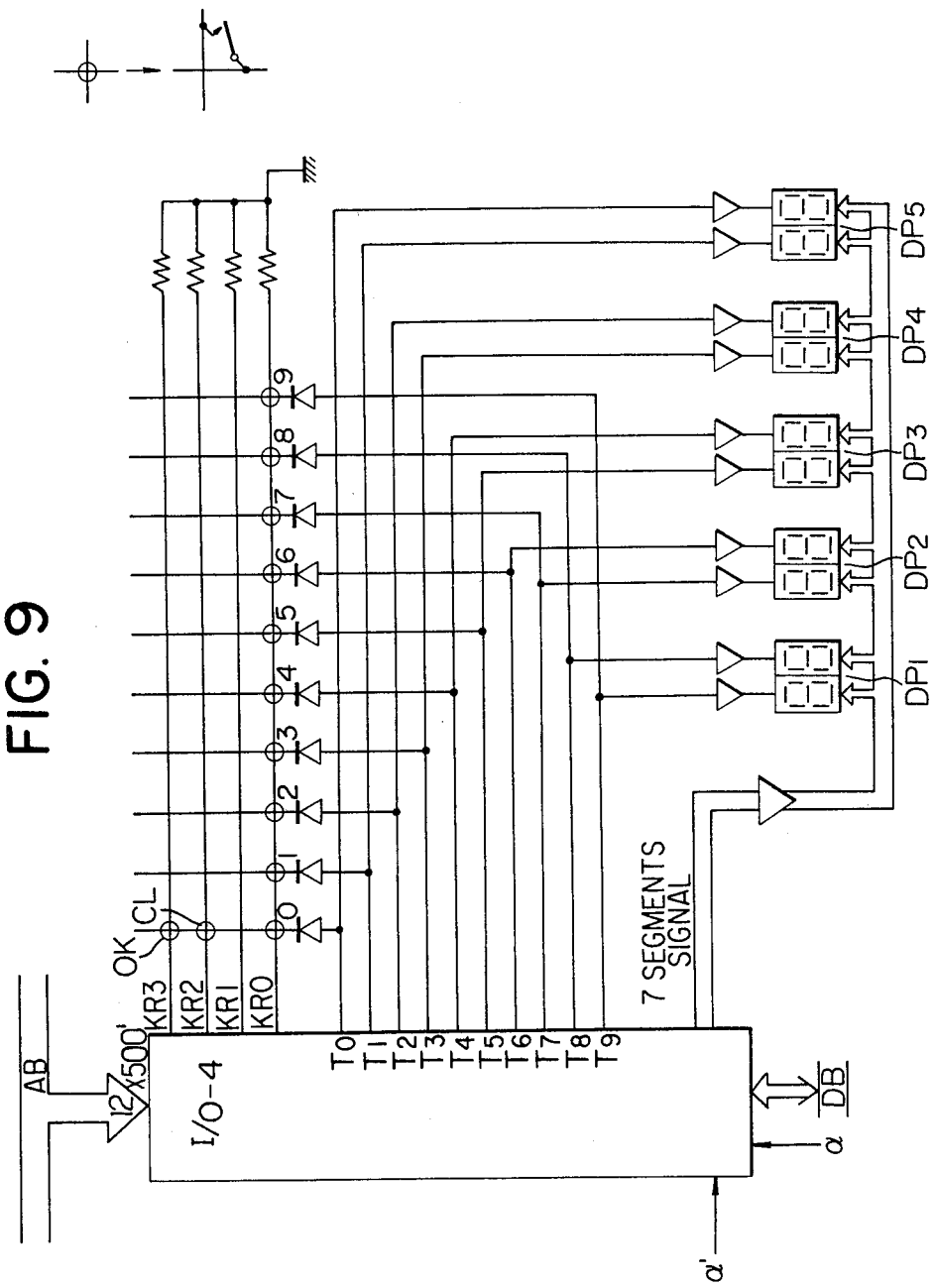
FIG. 9 is also an external connection diagram of the input-output unit I/O-4.
Figure 12A:
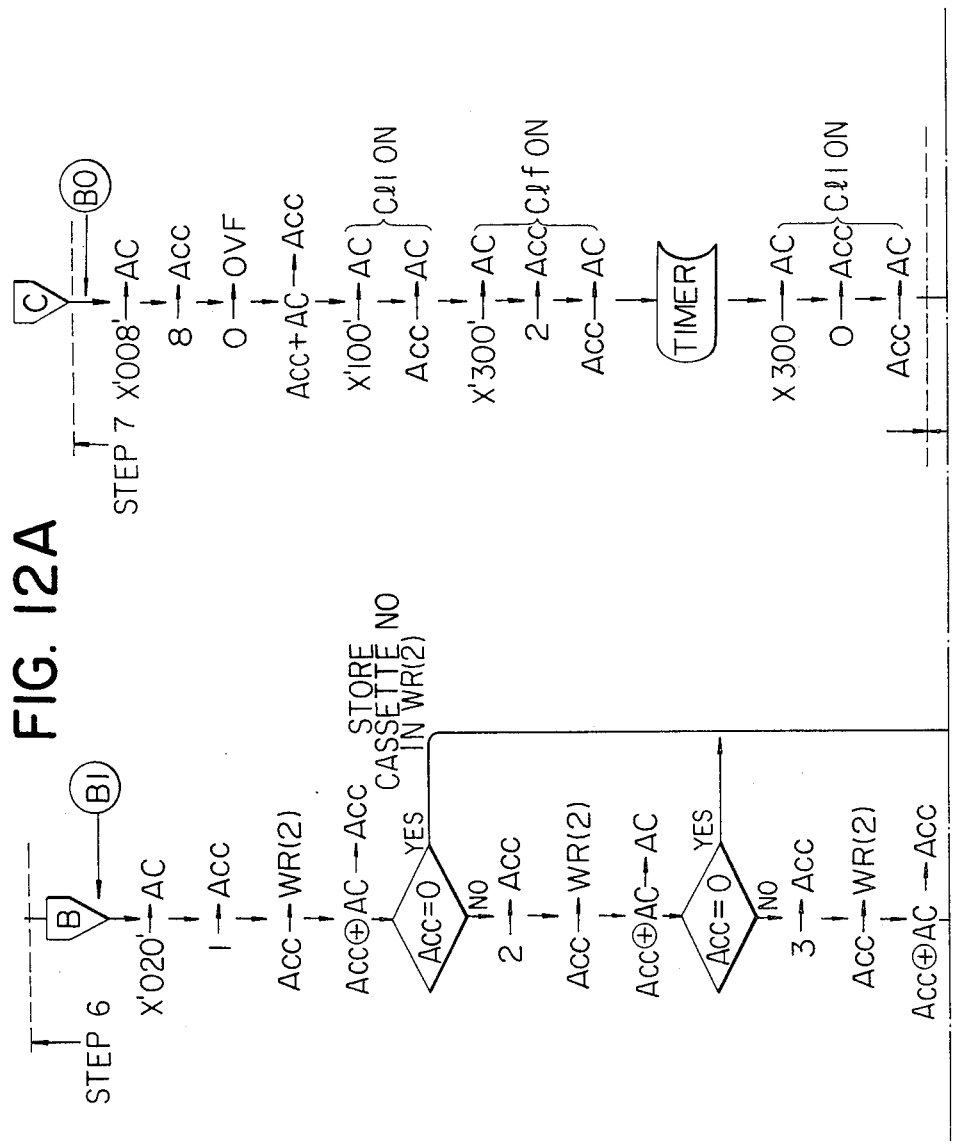
Figure 13A:
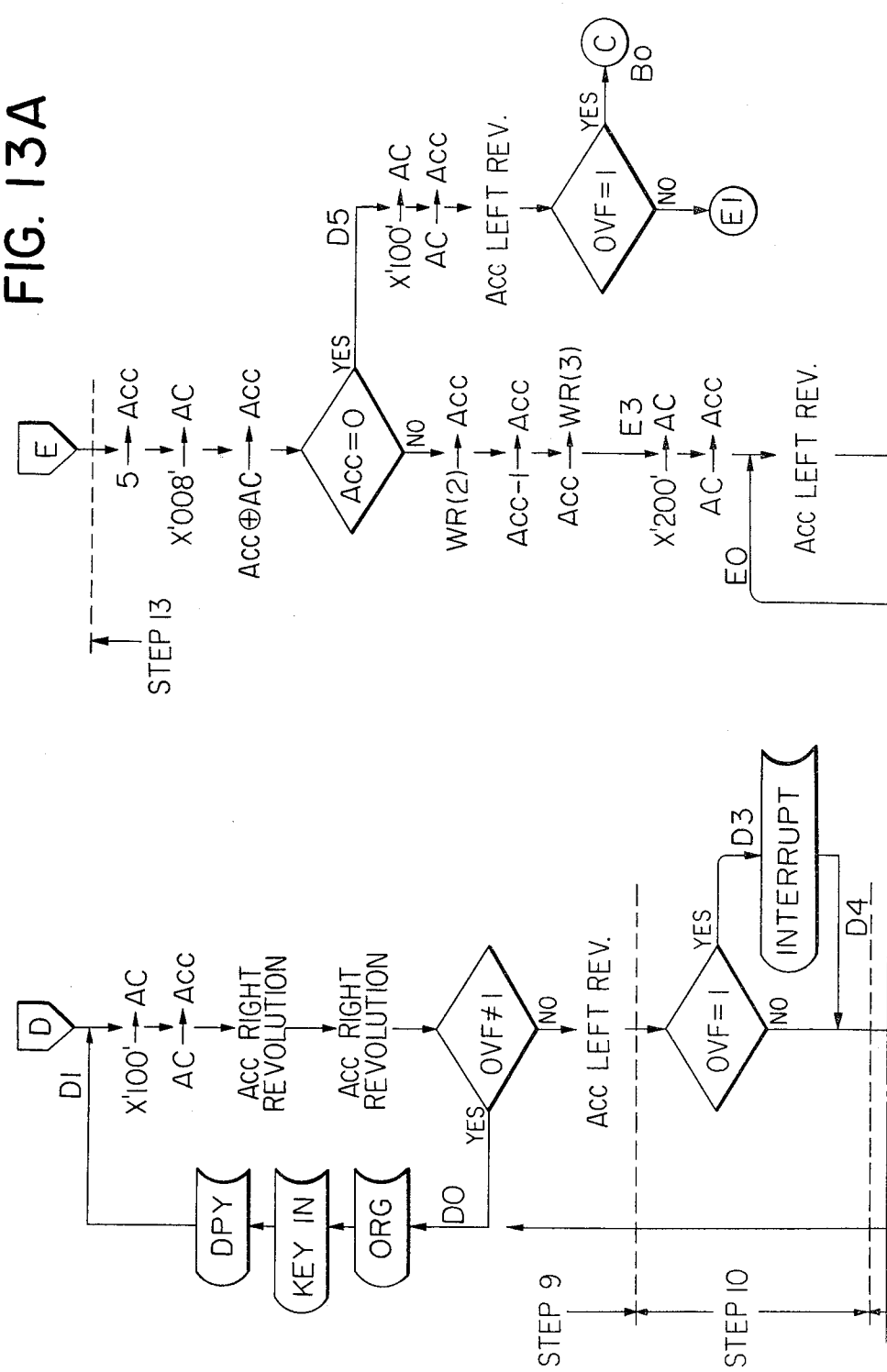
Figure 14A:
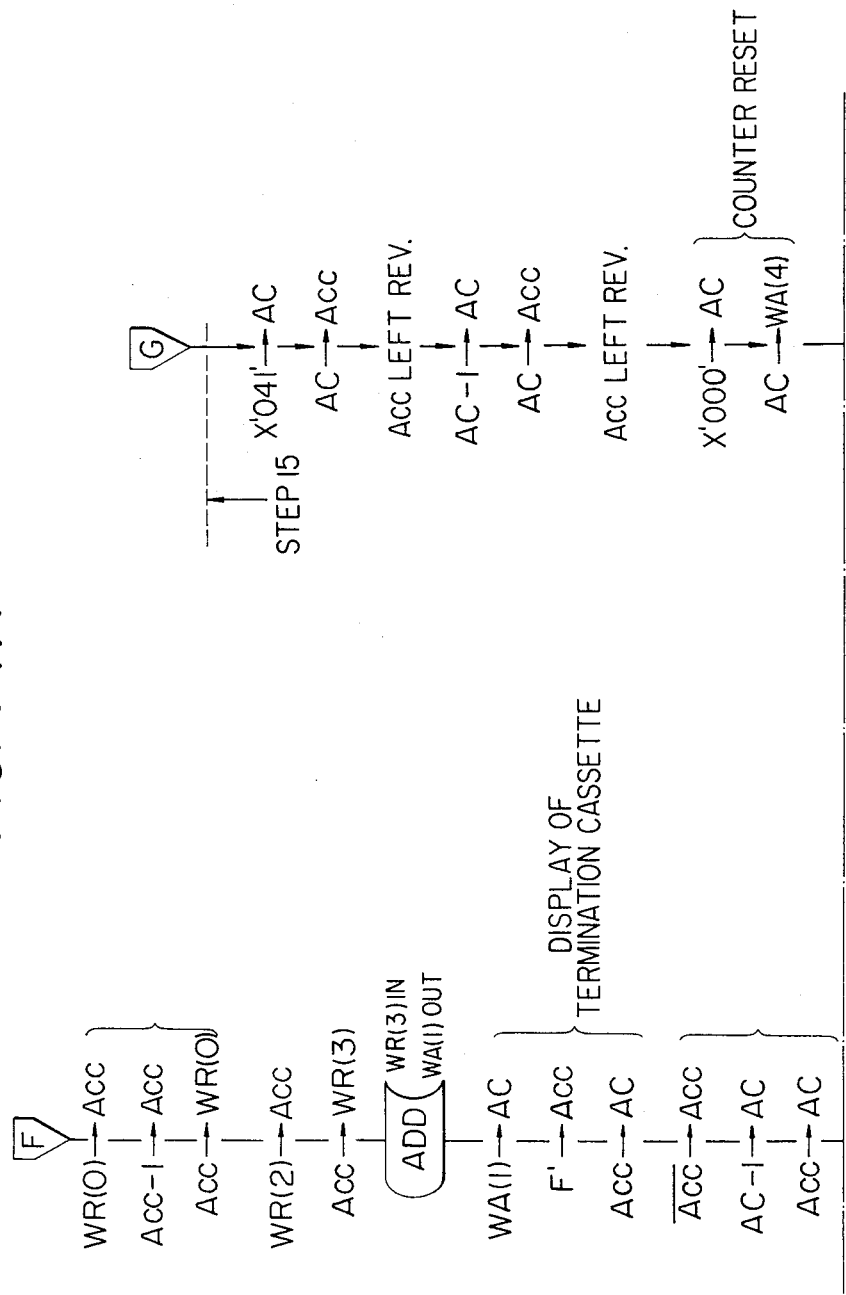

Details of another input-output unit I/O-4 in FIG. 4 are shown in FIG. 9. This input-output unit is to produce an output signal to control keys required for setting the number of copy sheet as well as indicators to indicate the set number of copy sheet. For such unit, there may be used, for example, "μp D757", a product of Nippon Electric Co. Ltd., Japan. In the drawing, numerals "0", "1", . . . , "9" designate numerical keys, CL refers to a clear key, and OK denotes a copy sheet number setting completion key. DP1 to DP5 respectively indicate informations with respect to the original mounting bins 9 to 5. This input-output unit further possesses a circuit for key codes, a buffer register for key input control, a shift register for storing therein the indicated data, a place signal generator for indicating the indicated data in time-division. CPU includes the abovementioned memory, one or more registers AC and PC for designating address of the input-output unit, one or more registers ACC, Tm, C and D for other primary memory, an overflow bit OVF, a flag CFT, a control section CT having an addition-subtraction logic control which decodes the input data from the data signal lines and disposes of such data, and an operational circuit ALU. This operational circuit ALU possesses the functions of decimal correction, addition, exclusive logic summation of the data. The contents of the register A can be revolved rightward (right shift) and leftward (left shift). CPU possesses the abovementioned circuits, and is connected with the abovementioned external circuits by a plurality of connecting lines. Explaining the outlines, an address for ROM, in which the sequence is first programmed is designated from CPU. Then, the content of the designated address is read into CPU through a data signal line DB1. The CPU decodes this address code, and, in accordance with the decoded contents, the data are processed within CPU per se, when the signals are in the time-sequence from closure of the power source. Or, in some occasion, the data in CPU are stored in a certain designated address in RAM, or the data of a certain designated address is introduced into CPU as an input. Or, in some occasion, the data in CPU is forwarded as an output to the signal line DB3 of the input-output units I/O-1 to I/O-4, or the contents on the signal line DB3 of the input-output unit is introduced into CPU as an input. In this manner, the sequence control is carried out.

In the following, detailed explanations will be given as to the control procedures according to the present invention.

To begin with, the basic timing for processing the sequence program will be explained in reference to a clock timing chart shown in FIG. 10. Individual instruction for the program is codified beforehand and stored in 8 signal lines in ROM. Designation of individual code is decoded by the address decoder through n numbers of cord from the address code generatrix, and one out of 2n numbers is selected for output. This ROM and the address in this ROM, where the instruction is stored, are designated by a ROM address designating register (PC). This register (PC) is given a function of adding +1 by a control signal α1, whereby the programmed instructions are sequentially produced as the outputs. The outputs from this register PC are introduced into ROM as the inputs thereto by means of multiplexers A to C in a predetermined time. The ROM produces output instruction codes therefrom into eight lines. However, since the data code generatrix DB1 has only four lines, these outputs are time-divided and sent into the data code generatrix in two times. The instruction codes outputs which have been produced from ROM in two times, four lines at each time, are latched by the registers C and D through opening and closing of the switches SW9, SW6, and SW7 due to the clock signal α, and these contents are decoded by an instruction decoder to thereby generate the control signal α for processing in accordance with the contents of the instruction. In short, the designation of the address where the program is stored as well as decoding of the instruction codes stored in the address are completed by the four basic clocks, as shown in FIG. 10, and the contents of the abovementioned instructions are executed during the subsequent six clock cycles. And, the programmed instructions subsequent to the abovementioned address are again executed at a similar time interval. Accordingly, in order to execute any one of the execution instructions (1 step) in a series of programmed sequences, a time corresponding to ten clock cycles is necessary. In the case of 2-word instruction, 20 clocks become necessary. Each switch SW is a gate circuit to be controlled by the control signal α, while OVF is a known circuit per se for detecting overflow of the register Acc. The control section CT is a circuit for decoding the registers C and D, operating the register Tm, and producing the control signal α.

The operations of the control unit of the abovedescribed construction will now be explained in reference to the construction diagram as already mentioned as well as the explanatory diagram for the operations as shown in FIGS. 11 through 24.

First of all, the instructions for each step shown in FIGS. 11 to 23 will be explained in utilization of "μCOM4" of Nippon Electric Co. Ltd., Japan.

1. 0100 X1X2X3X4 address designating instruction Y1Y2Y3Y4 Z1Z2Z3Z4

X1–X4 are transferred to AC3, Y1–Y4 to AC2, and Z1–Z4 to AC1. During execution of the program, the address within ROM is designated by PC, the code 0100 is produced as an output in the data code generatrix, in the timing 3 and T1, and is latched by the register C in the timing T2 due to opening and closing of the switches SW6 and SW9. In the same manner, the code is decoded in the timing T2 to be recognized as the address designating instruction, and the subsequent X1 to X4 are produced as the outputs into the abovementioned generatrix also at the timing T2, and are latched by the register PB3 at the timing T3 due to opening and closing of the switches SW9 and SW15. Following this, the codes Y1 to Y4 and Z1 to Z4 in ROM subsequent to the abovementioned addresses are produced as the outputs by adding +1 to PC. These codes are stored in AC2 and AC1, based on which new addresses desirous of being used in the subsequent programming are stored in PB. This execution timing slightly differs from that shown in FIG. 10.

2. 0101 X1X2X3X4 jumping instruction Y1Y2Y3Y4 Z1Z2Z3Z4

When the jumping condition of X is established, the jumped addresses Y1–Y4 and Z1–Z4 are respectively transferred to AC2 and AC1, followed by further transfer of AC2 to PC2 and AC1 to PC1, thereby completing the jumping. However, if the jumping condition is not established, no jumping is effected. If X1–X4 assume a code 0010, this means the jumping instruction when they detect the overflow OVF as 1, and if they take a code 0100, it means the jumping instruction when the register Acc is 0. The code 1000 means the open condition, the code 1010 means that OVF is 0, and the code 1100 means the jumping instruction when the register Acc is not 0. First, an address within ROM is designated by PC at the timings T1+T2, the code 0101 is produced as an output in the data code generatrix at the timing T1, and the code is latched by the register C at the timing T2 by opening and closing of the switches SW6 and SW9. In the same manner, subsequent X1–X4 are produced as outputs in the abovementioned generatrix at the timing T2, and are latched by the register D at the timing T3 due to opening and closing of the switches 7 and 9. Assume now that X1–X4=0100. The codes 0101 and 0100 are decoded at the timing T4 to confirm that they are respectively the jumping instructions and that they discriminate the contents of the register Acc. At the subsequent timings T5 to T10, discrimination is made as to whether the content of the register Acc is zero, or not. If its content is not zero, +2 is added to PC to avoid the jumping instruction. If it is zero, +1 is added to PC to store the codes Y1–Y4 and Z1–Z4 of ROM, subsequent to the previous code, into AC2 and AC1, respectively, by opening and closing of the switches SW9, SW11 and SW13. Further, AC2 is transferred to PC2, and AC1 to PC1. In this way, an address for jumping appears on PC, and the new address for the jumping is designated in ROM at the subsequent timings T1 to T10, thereby completing the jumping.

3. 0110 1000 transfer instruction (1)

Data of the address set in AC are stored in the register Acc (hereinafter referred to as "load"). The address in ROM is designated by PC at the timings T1+T2, and the code 0110 is produced as an output in the data code generatrix at the timing T1, and then latched by the register C at the timing T2 due to opening and closing of the switches SW6 and SW9. In the same manner, the subsequent code 1000 is produced as an output in the data code generatrix at the timing T2, and latched by the register D at the timing T3 due to opening and closing of the switches SW7 and SW9. The codes in the registers C and D are decoded at the timing T4. The code in the register AC is produced as an output in the address code generatrix at the timings T5 to T10, and the content of any of RAM to be designated with this address, the output unit, and the keying registers for the key display input-output unit is produced as an output in the data code generatrix, and stored in the register A due to opening and closing of the switches SW9 and SW2.

The same operations are carried out for the subsequent steps, hence they will be tabulated only briefly in the following table 1.

TABLE 1

| | REGISTER C | REGISTER D | CONTENTS OF CONTROL |
|---|---|---|---|
| 4. | 0 1 1 1 | X1X2X3X4 | Load X1–X4 on register Acc. |
| 5. | 1 0 0 0 | 1 0 0 0 | Store register Acc in the address designated by Ac. |
| 6. | 1 0 0 1 | 1 1 0 0 | Exclusive OR between the address data designated by registers Acc and AC. |
| 7. | 1 1 1 0 | 0 0 0 1 | Transfer AC to PC. |
| 8. | " | 0 0 1 0 | Transfer PC to AC. |
| 9. | " | 0 0 1 1 | Exchange PC for AC. |
| 10. | " | 0 1 0 0 | Add +1 to AC. |
| 11. | 41 | 0 1 0 1 | Add −1 to AC. |
| 12. | " | 1 0 0 0 | Transfer register Acc to AC1. |
| 13. | 1 1 1 0 | 1 0 0 1 | Transfer register Acc to AC2. |
| 14. | " | 1 0 1 0 | Transfer register Acc to AC3. |
| 15. | " | 1 0 1 1 | Transfer register to Acc to register Tm. |
| 16. | " | 1 1 0 0 | Transfer AC1 to register Acc. |
| 17. | " | 1 1 0 1 | Transfer AC2 to register Acc. |
| 18. | " | 1 1 1 0 | Transfer AC3 to register Acc. |
| 19. | " | 1 1 1 1 | Transfer register Tm to register Acc. |
| 20. | 1 1 1 1 | 0 0 0 0 | Clear register Acc and OVF. |
| 21. | " | 0 0 0 1 | Clear OVF. |
| 22. | " | 0 0 1 0 | Clear register Acc. |
| 23. | " | 0 1 1 0 | Left revolution of register Acc and OVF OVF→Acc A3→OVF |
| 24. | " | 0 1 1 1 | Right revolution of register Acc and OVF A3→OVF OVF→A3 |
| 25. | " | 1 0 1 0 | Add +1 to register Acc. |
| 26. | " | 0 1 1 | Add −1 to register Acc. |

In the following procedures where the controls are carried out by using the above-enumerated instruction codes, the codes for setting the required input-output unit and the memory per se are as follows ("X" means that no restriction is imposed on the code.)

TABLE 2

|  | PC3(AC3) | PC2(AC2) | PC1(AC1) |
|---|---|---|---|
| R O M | 0 0 0 0 | X | X Address designation in ROM |
| R A M | 0 0 0 1 | X | X Address designation in RAM |
| Output Unit(1) | 0 0 1 0 | X | X |
| Output Unit(2) | 0 0 1 1 | X | X |
| Output Unit(3) | 0 1 0 0 | X | X |
| Output Unit(4) | 0 1 0 1 | X | X |
| Input Unit(1) | 0 1 1 0 | X | X |
| Input Unit(2) | 0 1 1 1 | X | X |

That is to say, of the twelve address code generatrixes, the higher four lines are for selecting the memory, etc., each of the memories and input-output units being provided with a known decoding circuit. The other eight lines are for designating partial address of the memory, each memory having a known decoding circuit. Each input-output section of the input-output unit corresponds to each place of the data 4-bit in each of the present embodiments, hence no particular designating circuit is required.

Explaining now the operations for the image original handling, when a power source switch (not shown) is turned on, the step 1 shown in FIG. 11 starts. At first, the flag register, the copy sheet number setting register, and the copy sheet number memory registers, and so forth within the memory RAM are set in predetermined values. For example, the registers WR(0), WR(1), WR(4) and WR(7) in the memory RAM shown in FIG. 6B are cleared. Then, the addresses "X020", "X021", "X022", "X023" and "X024", in RAM, and "X040" and "X041" in WA(0) are cleared. Here, explanations will again be given as to the address, taking "X020" as an example. The numerals in the first two places, i.e., "02" indicate the column, and the last one place, i.e., "0" indicates the row. For example, the processing sequence of the original receiving bins are stored in the addresses X020–X024. Further, when no image original is placed in the original mounting bins 5 to 9, "0F", for example, is indicated by the indicators DP5 to DP1 to indicate absence of the original therein. This indication of "0F" is done by setting the data of "0F0F0F0F0F" in X030 to X039 of RAM. Thus, the content of RAM is determined at the step 1.

Figure 15:
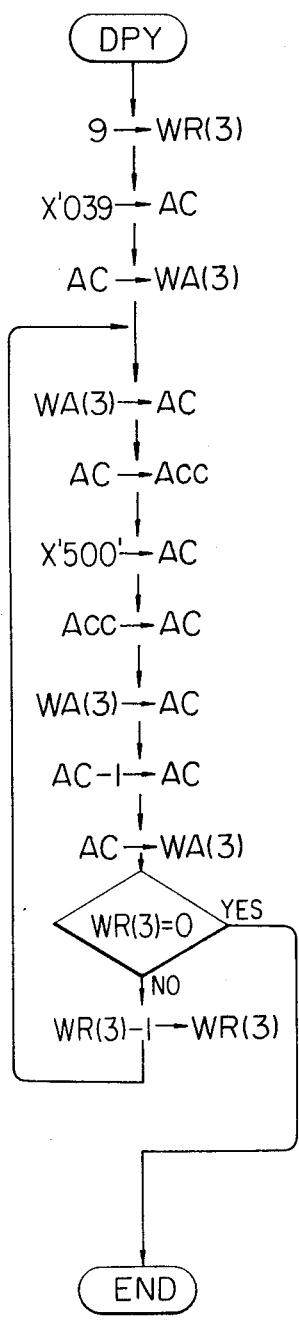

In the subsequent step 2, a control is effected to apply the contents of X030 to X039 to the indicators DP5 to DP1, the details of which are shown in FIG. 15.

At first, data "9" for selecting the indicators DP1 to DP5 is stored in the register WR(3). Such data "9" is determined by the fact that each of the segment type indicators DP1 to DP5 possesses 10 pieces of indicating bodies. In this case, the lower place of the indicator DP5 is sequentially selected. For example, if the lower place of the indicator DP5 is selected, the address information X039 of the register to be displayed next is set in the register AC, and then in the register WA(3).

Again, the address data of X039 in the register WA(3) is set in the register AC, and the thus set address data is set in the register Acc. Next, data X500 for selecting the input-output unit I/O-4 is set in the register AC, and the content of the register Acc is sent to the display register (not shown) of the input-output unit I/O-4. In this case, the content to be displayed in the input-output unit I/O-4 stands for the abovementioned "F". Then, the contents of the registers WR(3) and WA(3) are subtracted for the indicating body in the higher place of the indicator DP5 to be selected, and the data to be displayed in RAM is sent to the input-output unit I/O-4, as mentioned in the foregoing.

When the abovementioned operations have been repeated for ten times, transfer of the display data to the input-output unit I/O-4 terminates, and the display of the abovementioned data "0F0F0F0F0F" is effected by the input-output unit I/O-4.

Next, control of the step 3 is effected for searching whether the image originals are placed on the original mounting bins 5 to 9, or not.

The microswitches MSW5 to MSW1 of the detecting means respectively provided in the original mounting bins 5 to 9 introduce to the input-output units I/O-1 and I/O-2, as inputs thereto, signals for presence or absence of the image original, and into I0 to I3 of the input-output unit I/O-2 and I3 of the input-output unit I/O-2 respectively those signals for presence and absence of the image original, which are converted into electrical signals. By inspecting "1" (high level) or "0" (low level) of the input, the "1" level is determined as the presence of the image original. Then, discrimination is effected as to which one of I0–I3 of I/O-2 (X'200)'0 and I3 of I/O-1 (X'100)' takes the level "1", and in what order it takes the level "1". As the result of this discrimination, NO of the original mounting bin, into which the initial input is made, is stored in the address X020'. That is, when I2 of the input-output unit I/O-2 is initially introduced as the input, 2 is stored in the address X'020'. Then, NO of the original mounting bin, into which the second input is made, is stored in the address X'021'. In this manner, NO of the original mounting bins is stored in RAM of from X'020' to X'024' in the order, in which the copying should be done. For example, "1" is stored for the original mounting bin 9 and "5" is stored for the bin 5. The order of copying is such that the original mounting bin of the address X'020' is first done, the address X'021' is done second, the address X'022' is done third, the address X'023' is done fourth, and the address X'024' is done fifth (last). When no original is present in the contents of the addresses X'020' to X'0224', a value 0 is stored.

Figure 16A:
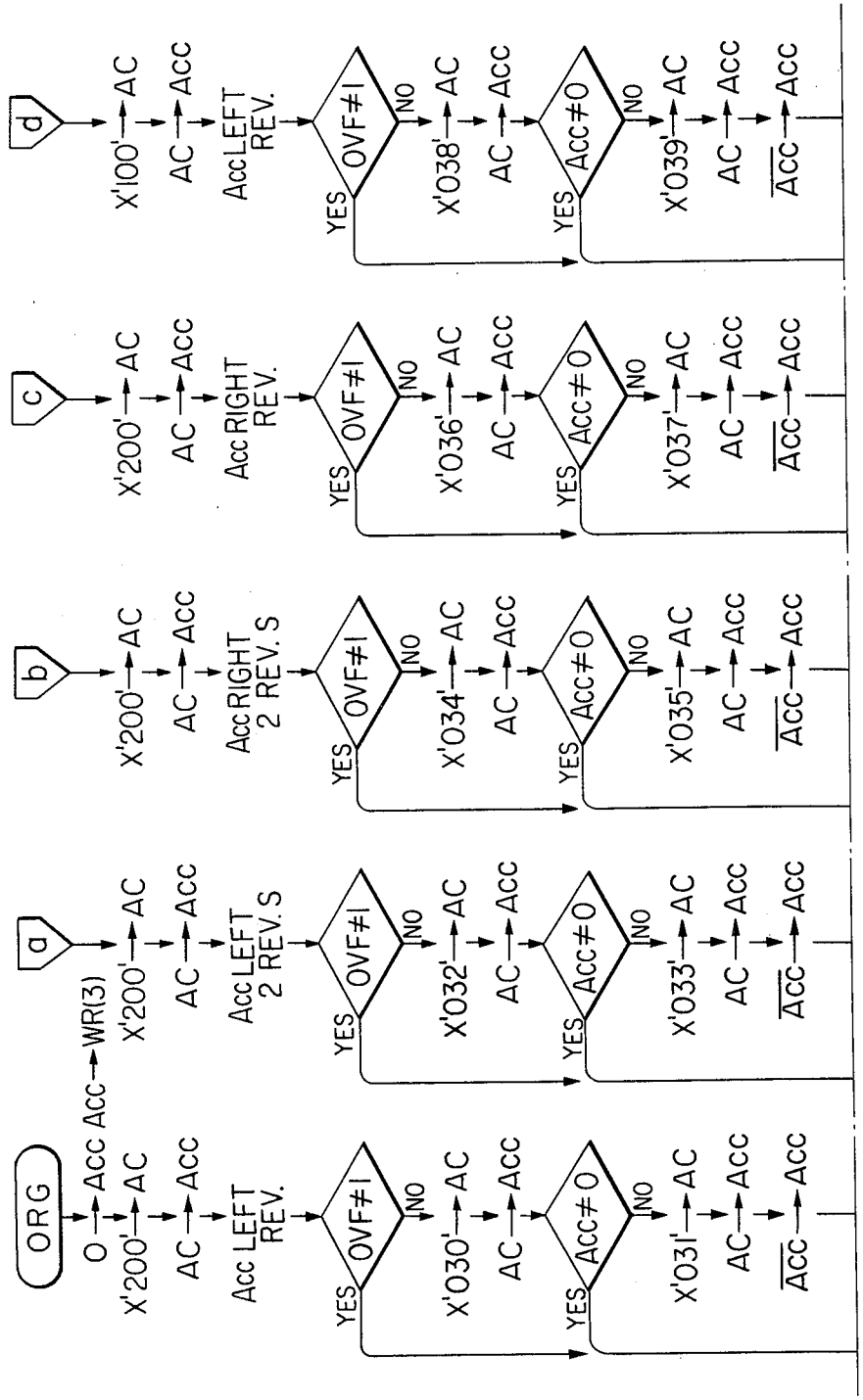

The abovementioned control procedures are shown in FIG. 16. That is, the register Acc and WR(3) are cleared first. Then, the address "X200" is set in the register AC, (this is an address data for selecting the input-output unit I/O-2, and 020 is actually set in the register AC) and the on-off state of the microswitches MSW1 to MSW4 of the input-output unit I/O-2, i.e., the data for the presence or absence of the image original, is put into the register Acc.

Next, in order to examine the content of the register Acc, the overflow bit OVF is subjected to the left revolution to shift the same for 1 bit to determine whether the overflow bit OVF is not 1, or not. As the result of this discrimination, if it is not "1", the microswitch MSW1 notifies that no image original is present on the original mounting bin 9. When no image original is placed in the original mounting bin 9, the address of the input-output unit I/O-2 is set in the register AC for detecting the state of the microswitch MSW2 for the original mounting bin 8, and the signals "1" and "0" indicating the state of the microswitches MSW1 to MSW4 are set in the register Acc through the data bus DB3 in parallel.

Next, the contents of the register Acc are subjected to two revolutions to set the state of the microswitch MSW2 in the overflow bit OVF, and then discrimination is made as to whether the overflow bit OVF is in "1" or "0". If no image original is in the original mounting bin 8, the overflow bit OVF is in "0", so that, in the same manner as mentioned in the foregoing, the subsequent microswitch MSW3 and further microswitch MSW4 are inspected. In the above-described embodiment, since the microswitch MSW5 provided in the original mounting bin 5 is in the input-output unit I/O-1, the address "X100" of the input-output unit I/O-1 is set in the register AC, when the microswitch MSW5 is to be discriminated.

Figure 18B:
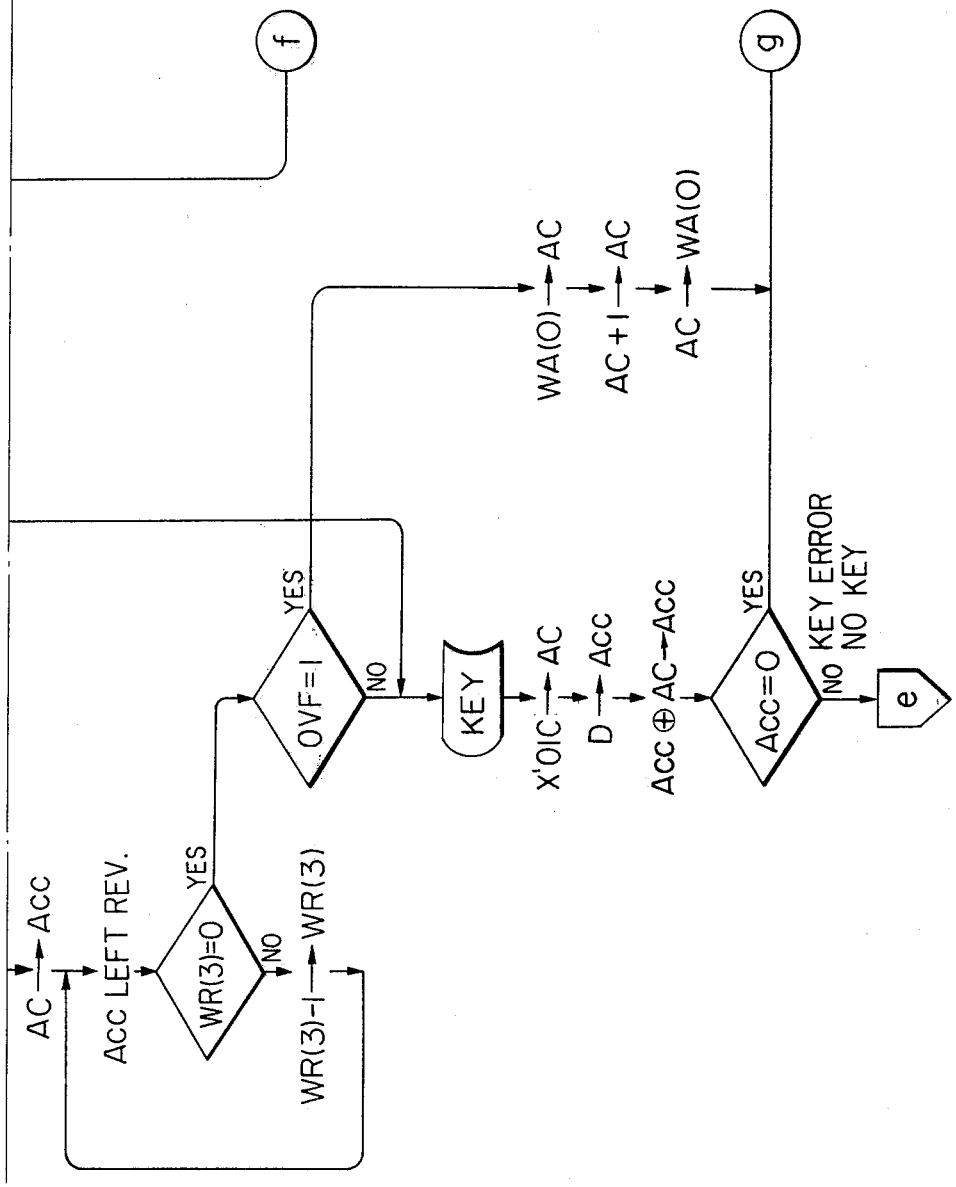
Figure 19B:
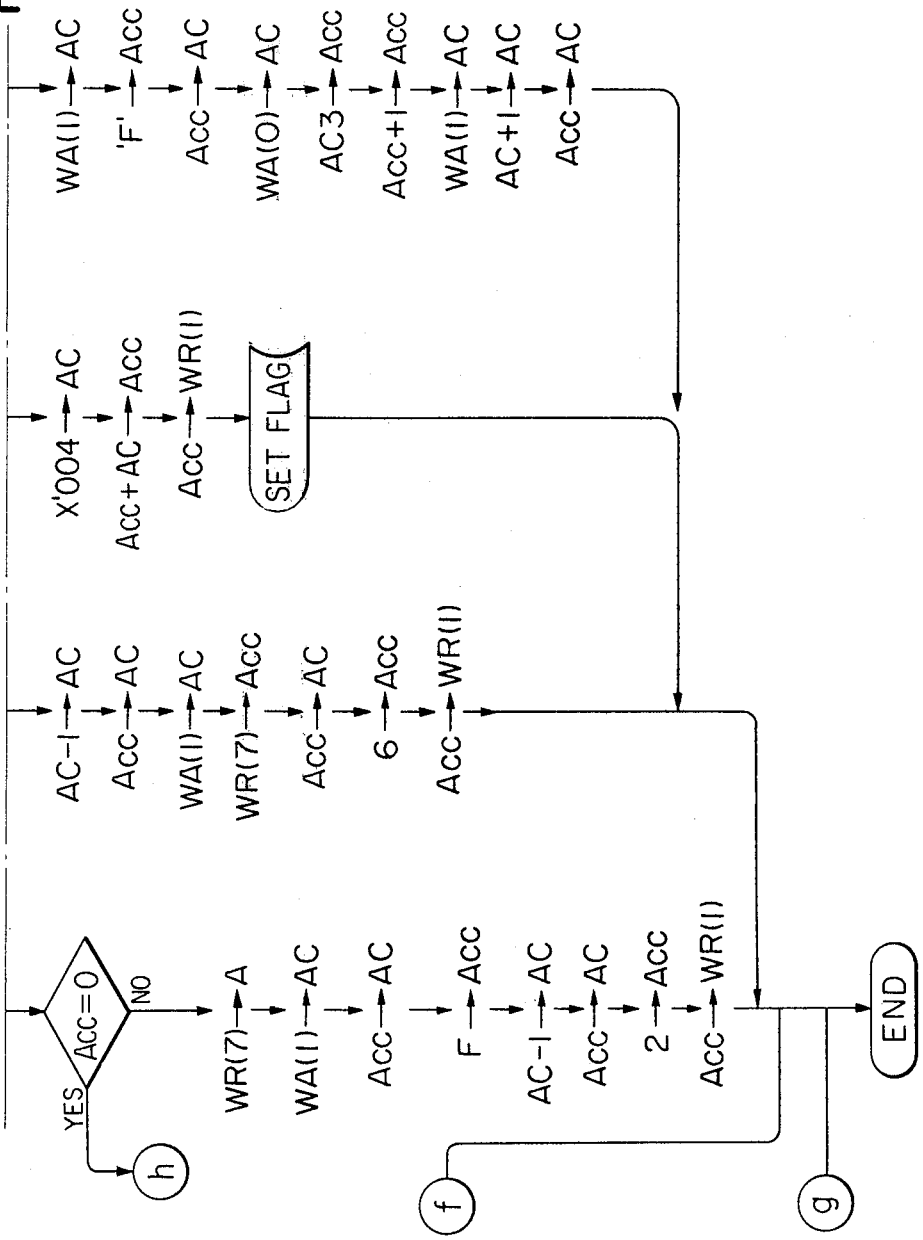

As mentioned above, when the discrimination control as to whether the image original is present, or not, has terminated, there is effected a key input control for the step 4. The details of the control procedures are shown in FIG. 18. As illustrated, the content of the register WA(0) of the memory RAM is forwarded to the register WR(3) through the register Acc. Since the register WA(0) has received therein the data of "X020", as already explained in the step 1, "0" of "X020" is set in the register WR(3).

Figure 20:
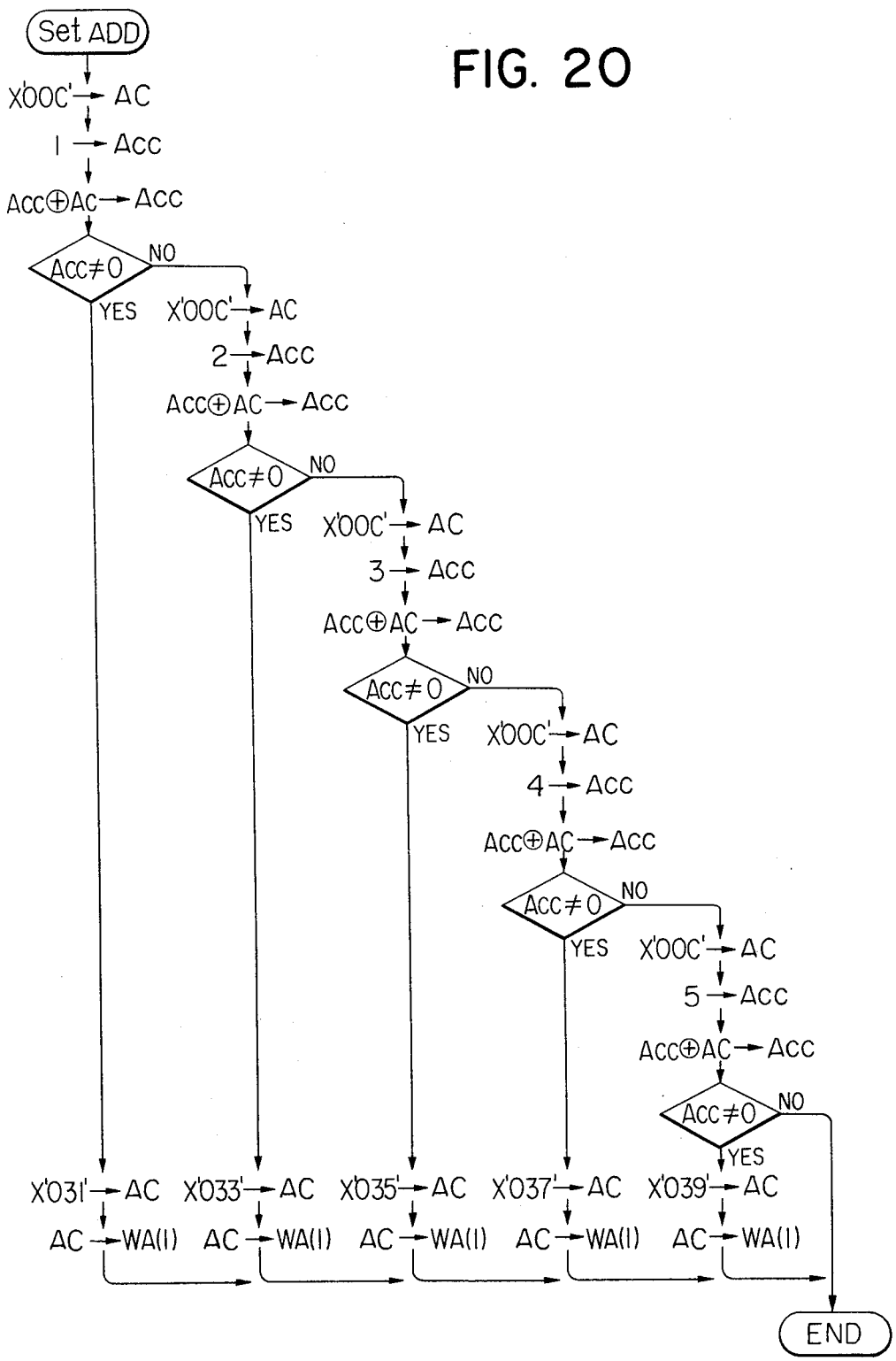
Figure 21:
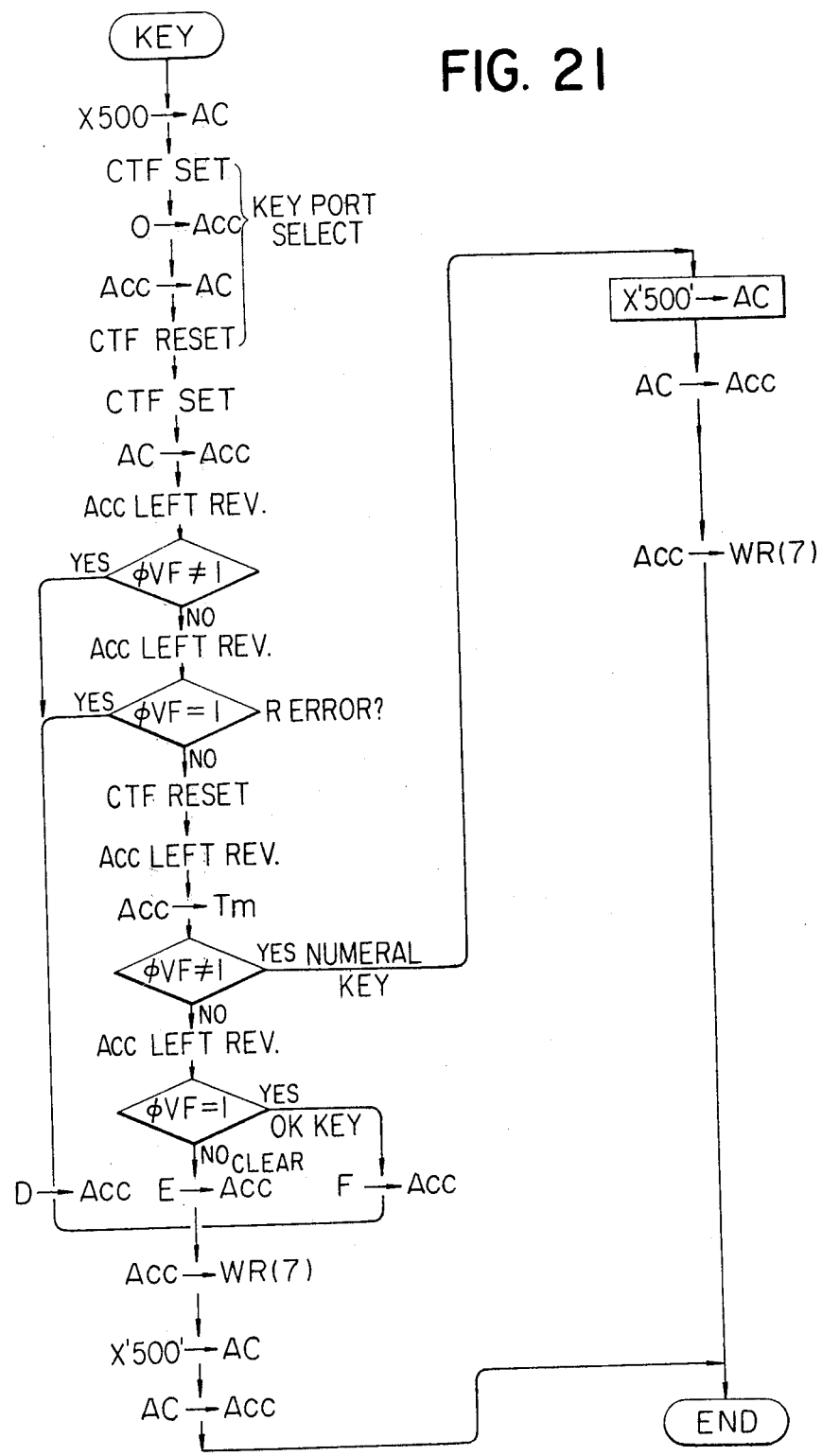

Next, "Set ADD" is carried out as shown in FIG. 20. The address data "XOoc" of RAM is first set in the register AC. The abovementioned address "XOoc" stands for the register WR(3). Subsequently, "1→Acc", i.e., "1" is set in the register Acc. Thereafter, "Acc⊕Acc", i.e., there is effected a control, in which the content of the register WR(3) and the content of the register Acc are compared by ALU (exclusive logic summation), and the compared result is stored in the register Acc, whereby the discrimination is done as to whether the content of the register Acc is not "0", or not. Since the value "1" is now set in the register Acc, "2" is set therein in place of "1" to perform the same operation, and, until "5" is set in the register Acc, the same operations are repeated. When "Acc≠0", the "Set ADD" control is skipped, and the address "X003" of the lowest place in the register WA(0) is stored in the register AO to set "4" in the register Acc. Then, comparison is effected between the register Acc and the lowest place of the register WA(0), and the discrimination is done as to whether the register Acc is "0", or not. Since it is not in "0" at this stage, the content of the lowest place of the register WA(0) is stored in the register WR(3) by the following procedures: WA(0)→AC, ACL→Acc, and Acc→WR(3). Next, the discrimination is effected as to whether the copy sheet number setting flags X040 and X041 are in "1" or "0". Since in this case, they are not set, the key input control shown in FIG. 21 is effected.

First of all, the address "X500" of the input-output unit I/O-4 is set in the register AC, and a signal is taken into the register Acc from the input-output unit I/O-4. When "μPD757" of Nippon Electric Co., Japan is used for the input-output unit I/O-4, and this unit is selected for the operation, a 4-bit signal is forwarded thereinto, notifying whether the key has been depressed, or whether any error in the key depression exits, or into which key input line the signal is forwarded. Then, in order to discriminate whether the key has been depressed, or not, the register Acc is revolved leftward to send a signal notifying whether the key is depressed to the overflow bit OVF, or not. Since the key is not operated at present, OVF≠1. Consequently, a data "D" generated from ROM is set in the register Acc, and the content of the register Acc is transferred to the register WR(7).

Then, by the key operating procedures shown in FIG. 18, the "KEY-IN" controls for the step 4 terminates: setting of the address "X01c" of the register WR(7) in the register AC; setting of "D" to be obtained from ROM in the register Acc; comparison by ALU of the content of the register WR(7) with the register Acc (exclusive logic summation); and setting of "0" in the register Acc.

After completion of the step 4, there begins the procedures for the step 5, in which completion of setting of the copy sheet number from the image original in the original mounting bins in discriminated.

In more detail, the address "X040" of RAM, in which the number of copy sheet number setting flag is stored, is set in the register AC, and the content of the address "X040" is set in the register Acc. Then, the content of the register Acc is revolved leftward (i.e., 1-bit left shift) and the content of the overflow bit OVF is checked. Since the content of the overflow bit OVF is "0", the display control of the step 2 is resumed, and the steps 2 to 5 operations are repeated until completion of setting of the number of copy sheet.

If five sheets of the image original are placed on the original mounting bin 6, the microswitch MSW4 is turned on, and the entrance of the image originals into the original mounting bin 6 is detected at the step 3 in the repetitive operations of the steps 2 to 5, as follows.

Figure 17A:
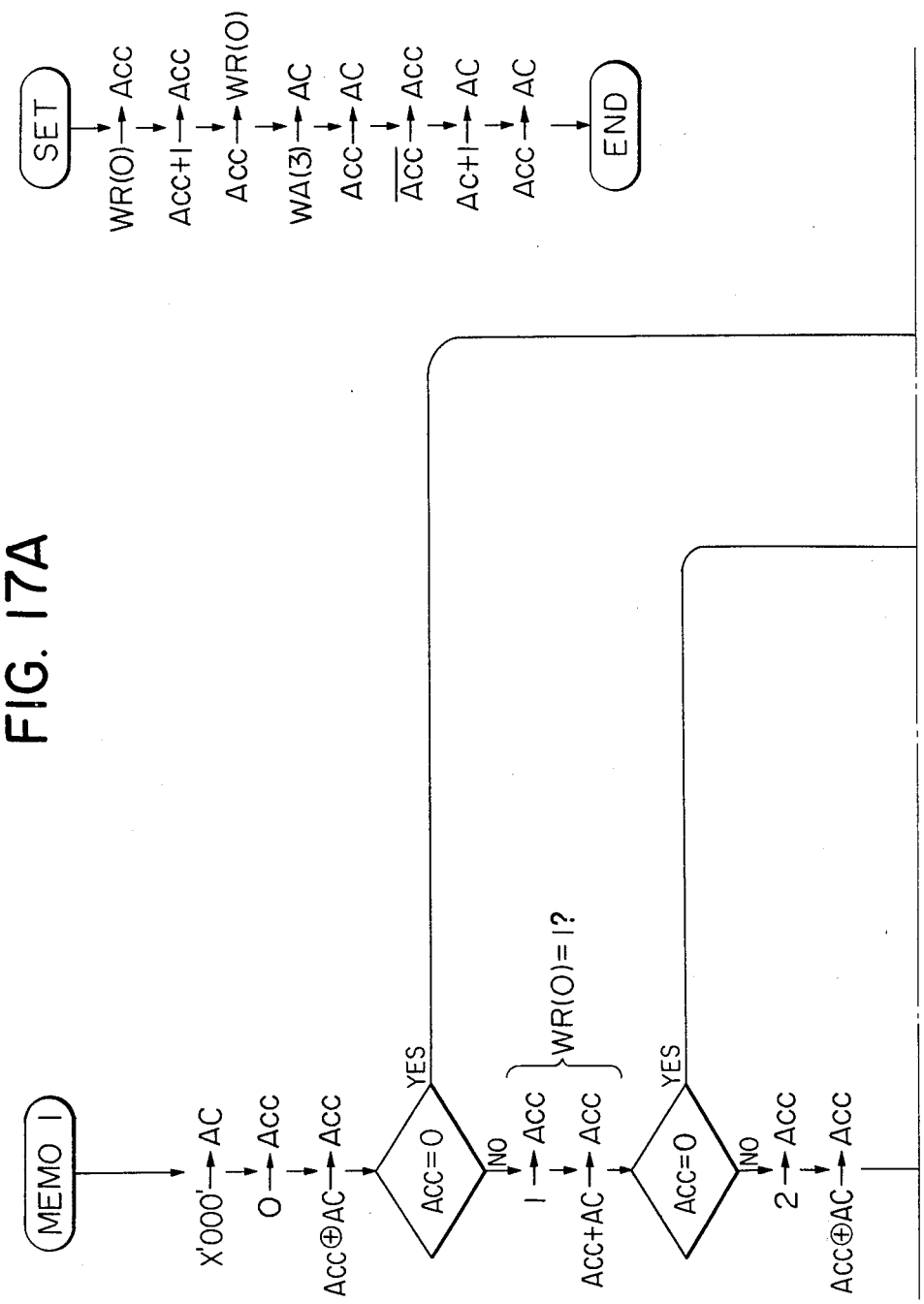
Figure 17B:
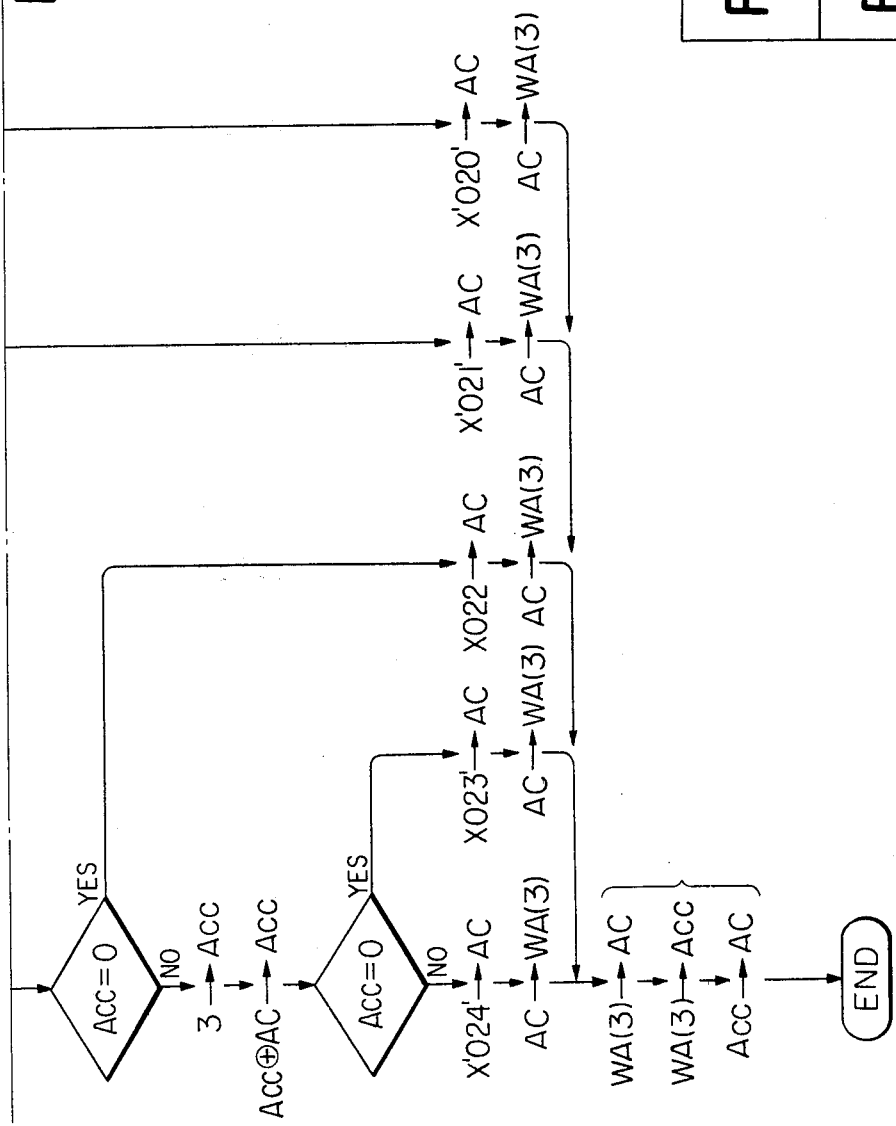
Figure 17:
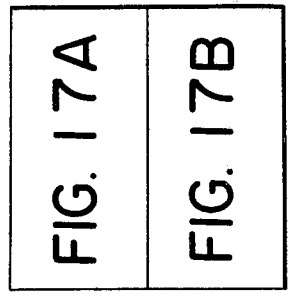

As explained in the above step 3, the microswitch MSW1 et seq. are checked sequentially. When the detection is done by the microswitch MSW4, the address "X200" is set in the register AC, and the states of the microswitches MSW1 to MSW4 are stored in the register Acc. Next, in order to verify the state of the microswitch MSW4, the register Acc is revolved rightward (1-bit right shift) and a signal indicating the state of the microswitch MSW4 is set in the overflow bit OVF, and discriminated. Since the overflow bit OVF is "1" at present stage, the address "X036" is stored in the register AC, and the content of the address "X036" is transferred to the register Acc. Then, the content of the abovementioned register Acc is discriminated. Since "0" is set in this register Acc, as already mentioned, the content of the address "X037" to be taken out subsequently is "F" as mentioned in the foregoing. A complementary number "0" of such "F" is stored in the register Acc, and the discrimination is effected as to whether the content of the register Acc is "Acc≠0", or not. Since it is also "0" here, a data "4" is sent into the register Acc from ROM, and stored in the register WR(3) to effect "Memo" control, the details of which are shown in FIG. 17.

First, the address "X000" of the register WR(0) is stored in the register AC, and then "0" is transferred to the register Acc. Then, the exclusive logic summation of the contents of the registers WR(0) and Acc is taken at ALU, the result of which enters into the register Acc.

Subsequently, the discrimination is effected as to whether the content of the register Acc is "0", or not. Since it is "0" at the present stage, the address "X020" is stored in the register AC. This address is further transferred to the register WA(3). Next, in order that the data "4" stored in the register WR(3) may be stored in the register WA(3), the operations of WA(3)→AC, WR(3)→Acc, and Acc→AC are carried out to terminate the "Memo" control. Next, in order to indicate that the reproduction of the image original in the original mounting bin 6 is the first, the address "X036" is stored in the register WA(3) to commence the set control as shown in FIG. 17.

First, the content of the register WR(0) is added with +1, and then the address data "X036" of the previous register WA(3) is stored in the register AC, and the data "1" of the register WR(0) is stored in the address "X036". At this time, "F" is also set in the address "X037". In this consequence, the contents of the addresses "X030" to "X039" take "0F0F0F1F0F". (The indication of the data "1" denotes the order of copying.)

Next, when the key is not operated, the steps 4 and 5 are effected as mentioned in the foregoing. When the step 2 is resumed, the indicator DP4 displays "1F", and the other indicators display "0F".

As mentioned in the foregoing, when the second image original is set, for example, on the original mounting bin 9, after the first image original enters into the original mounting bin 6, the "on" state of the microswitch MSW1 is detected during the control for the step 3 as mentioned above, and the same operations are effected until the "Memo" control as shown in FIG. 17 commences, although the data "1" to notify the position of the original mounting bin 9 is stored in the register WR(3). When the "Memo" control operation starts, the content of the register WR(0) is first checked. Since, at this time, the image original has been placed on the original mounting bin 6, the register WR(0) sets its content in "1". Consequently, the second determination is the "Memo" control takes "yes", the address "X021" is stored in the register WA(3), and the data "1" of the register WR(3) is stored in the address "X021", whereby the "Memo" control terminates.

Next, in order that the image original has entered into the original mounting bin 9, and that the image original in the original mounting bin 9 is set in the second order, the data "2" is set in the address "X030" of RAM, and the data is also in the register WR(0).

As stated above, if no operation is effected after the second image original has entered into the original mounting bin 9, there are effected both the original detection and the key detection, as mentioned in the foregoing, to carry out again the display control. Thereafter, since the data "2F0F0F1F0F" is set in the addresses "X030" to "X039", the indicator DP1 displays "2F", the indicator DP4 "1F", and the other indicators "0F". (The data "2F" denotes the order of copying.) Next, when the numerical value key is manipulated, the data storage for the number of copy sheet to each image original in the original mounting bin 6, which has been set in the first order, is effected in accordance with the "KEY-IN" control of the step 4 as shown in FIG. 18, as follows.

Now assume that 23 copies are to be made from one image original. Since the register WA(0) has stored therein the data of the address "X020" in the step 1, the data "4" is set in the register Acc by the procedures WA(0)→AC, and AC→Acc. Next, "Set ADD" control (shown in FIG. 20) commences, wherein the address "X037", into which the copy sheet number setting data of the original mounting bin 6 enters, is set in the register WA(1). Then, discrimination is effected as to whether the copy sheet number setting operation has been finished, or not. If it has not yet been set, the "KEY" control operation shown in FIG. 21 is effected to discriminate the numerical key operation. In this instance, since the input-output unit I/O-4 has already accommodated therein informations as to whether the key is present for the 4-bit data (1-bit), whether there is any key error (1 bit), or in which signal line the key is present (2-bit to denote KR0-KR3), the presence or absence of the abovementioned informations is determined by whether the data "1" is in the particular bit, or not. If the data "1" is not in the particular bit, the data "2" of the numerical key enters into the registers Acc and WR(7) from the input-output unit I/O-4.

Next, discrimination is again effected as to which key has been operated. If the numerical key is operated, the discrimination is effected from the content of the register WR(1) as to whether the number placed for the key is on the first place, or not.

Next, the data "2" of the register WR(7) is taken into the register Acc, while the data of the address "X037" stored in the register WA(1) is forwarded to the register AC so as to store the data "2" in the address "X037". Next, in order to memorize that "F" is stored in the address X036 and the data has been placed once, the data "2" is stored in the register WR(1), thereby terminating the "KEY-IN" control. At this stage, since the setting completion key OK has not yet been operated, the display control is again taken up, and the data "2F0F0FF20F" is displayed on the indicators DP1 to DP5.

Next, when the numerical key "3" is manipulated, there is effected the "KEY" control shown in FIG. 7 same as mentioned above, and, after the second checking has been effected as to whether the numerical key has been depressed, or not, the second numeral placement acts to transfer the content "2" of the register WR(1) to the register Acc. Then, the register Acc is subjected to the right revolution (right shift) for two times. If a code "1248" is shown, the numeral "2" signifies "0020", so that the data "1" is placed in the overflow bit OVF, and the following controls are effected.

The data "2" stored in the address "X037" is transferred to the address "X036" to cause the data "3" to be stored in the address "X037", and the data "6" (i.e., 0110) to be stored in the register WR(1), thereby terminating the "KEY-IN" control. By this key input, the indicators DP1 to DP5 respectively have the data "2F", "0F", "0F", "23" and "0F". Since, at this stage, no setting completion key has been manipulated, the controls for the steps 2, 3, 4 and 5 are repeated.

Figure 22A:
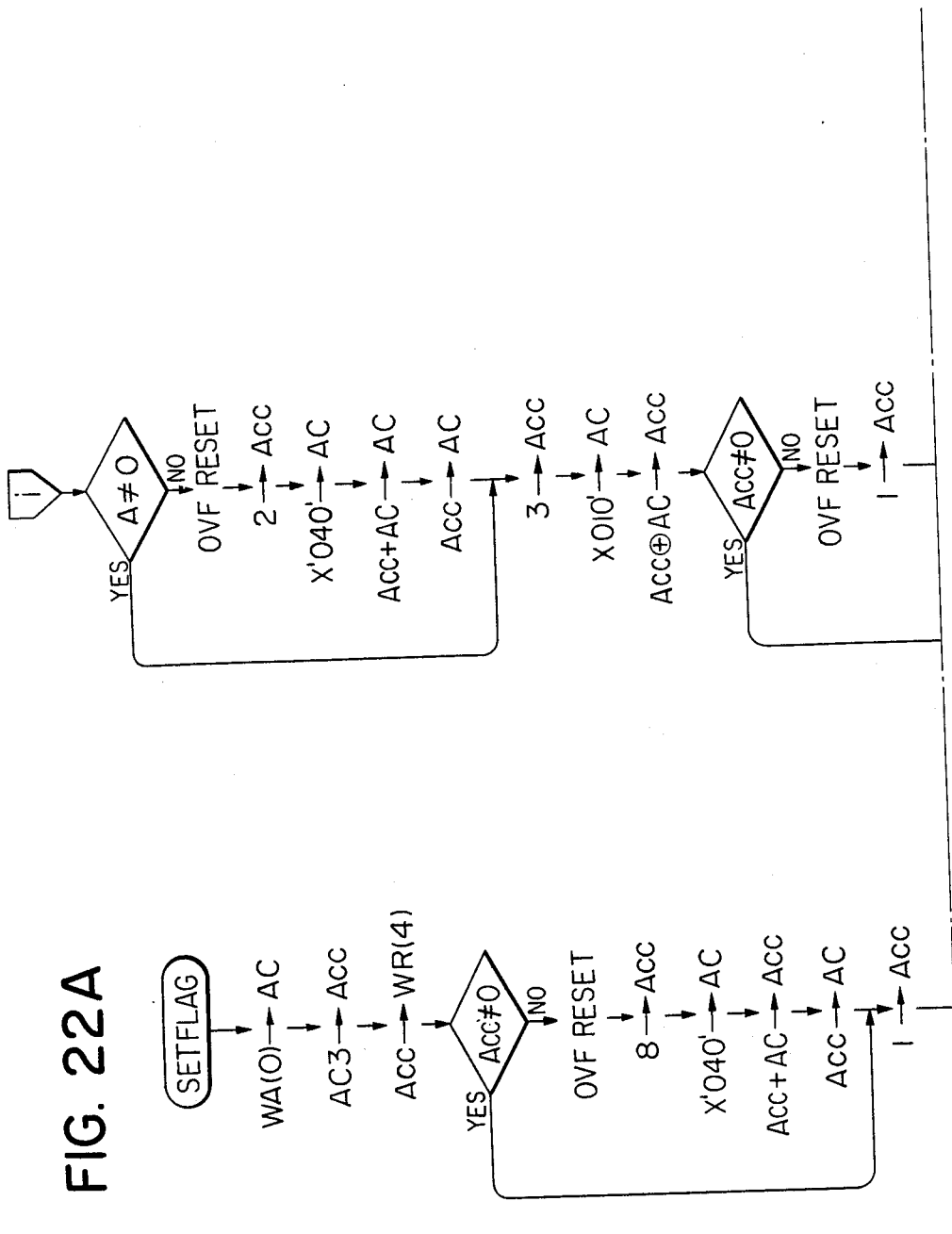

Next, the setting completion key of the abovementioned copy sheet number data is manipulated. Upto the "KEY" control in the "KEY-IN" control, the abovementioned operations are performed. When manipulation of the completion key is discriminated during the KEY control, the data "F" is set in the register Acc, and further in the register WR(7). The manipulation of the completion key OK is checked twice, as is the case with the abovementioned numerical key. When the completion key OK is manipulated, the content of the register WR(1) is discriminated to find out whether the numerical data has been set, or not. If it is set, the data "7" is set in the register WR(1). Next, in order to memorize that the data "0" at the lower one place of the register WA(0) in the "set flag" shown in FIG. 22 is set in the register Acc, that the content of the register Acc has been determined, and that the completion key OK has been manipulated, the data "0" at the lower one place of "020" in the register WA(0) is set in the register Acc to determine its content, and the data "1" is stored in the uppermost bit of the address "X040". Next, when the numerical key and the completion key are manipulated in sequence, as the content of the register WA(0) is in "021", the data "1" is set in the bit second from the uppermost bit of the address "X040" with the data "1" at the lower one place of the content of the abovementioned register WA(0).

As mentioned in the foregoing, the flag is set in the address "X040", and the controls for the step 5 are effected. In other words, the uppermost bit of the address "X040" is introduced as an input into the overflow bit OVF, and "OVF≠1" is discriminated by the control circuit CT. Since the content of the overflow bit OVF is in "1" at this stage, the step 6 starts. First of all, the register WA(4), in which the counted data for the number of copy sheet is, is cleared. Next, NO (numerical value) of the original mounting bin of the address "X020" is stored in the register WR(2). NO (numerical value) given is from 1 to 5 with respect to the original mounting bins 9 to 5, respectively. Accordingly, the data "4" is stored in the register WR(2). Next, controls for the step 7 begin.

First, the address "X008" of the register WR(2) is set in the register AC. Subsequently, the data "8" is transferred from ROM to the register Acc, whereby the operation of "Acc+WR(2)→Acc" is effected. Next, the address "X100" of the input-output unit I/O-1 is set in the register AC, the data "12", i.e., "C" in the register Acc is forwarded to the input-output unit I/O-1, the code "1100" appears at the terminals $O_3$ to $O_0$ of the input-output unit I/O-1, a signal in the uppermost bit opens the gates AG1 to AG5, and the code "00" is applied to other input terminal of the AND gate AG4 by the decoder DE1, whereby a clutch cl-4 and then the pick-up roller are driven to cause one image original to be led out of the original mounting bin 6.

Next, in order that the abovementioned image original may be forwarded to the reproduction apparatus, the address "X300" is set in the register AC to set the data "2" in the register Acc, thereby driving the clutch cl-f in the same manner as the input-output unit I/O-1.

The time ON of the abovementioned clutch cl-1 is preset in the timer TMR, and is turned off as soon as it is sent out. Subsequently, arrival of the image original at a predetermined position is detected by the detecting means MSW6. Such detecting means MSW6 is a paper edge detecting unit 52 as shown in FIG. 1. During such control, detection is conducted to find out whether setting of the copy sheet number to the image original on the original mounting bin 9 has been done, or not. For instance, when the numerical key is operated to set the copy sheet number "9", the address "X020" stored in the register WA(0), which has memorized therein the order of the image originals placed on the original mounting bins, is changed to "X021" by the flag of the address "X040".

Next, when the "KEY-IN" control is resumed, the data "9" enters into the address "X031", and the data "F" enters into the address "X032", same as placing the data "2" for setting the copy sheet number to the image original on the original mounting bin 6 as mentioned above with the exception that the data stored in the register WA(0) is "X021". Further, when the setting completion key is manipulated, the data "1" is placed in the copy sheet number setting flags "040" and "041" of RAM same as the above-mentioned operations. Since the order of copying is second this time, the bit of the data "4" of the address "040" becomes "1".

After the abovementioned key operation, when the arrival of the image original at a predetermined position of the original mounting table is discriminated by the step 8, the clutch cl-f is disconnected to stop movement of the image original, and a copy start signal output is produced from the input-output unit I/O-3 to effect the copying operation of the image original.

In the subsequent step 9, the reproduction apparatus continues the respective process steps of electric charging, image exposure, image development, image transfer, and image fixation, during which light from the light source of the reproduction apparatus is detected in the exposure step, thereby effecting control for counting the number of copy sheet by on-and-off frequency of the light. A detected signal (lamp detect) of this light source is checked. Also, same as in the step 8, input and display controls of the setting keys for the other original mounting bins are effected during the checking. The detection of the light from the exposure light source completes copying of one sheet.

Figure 23A:
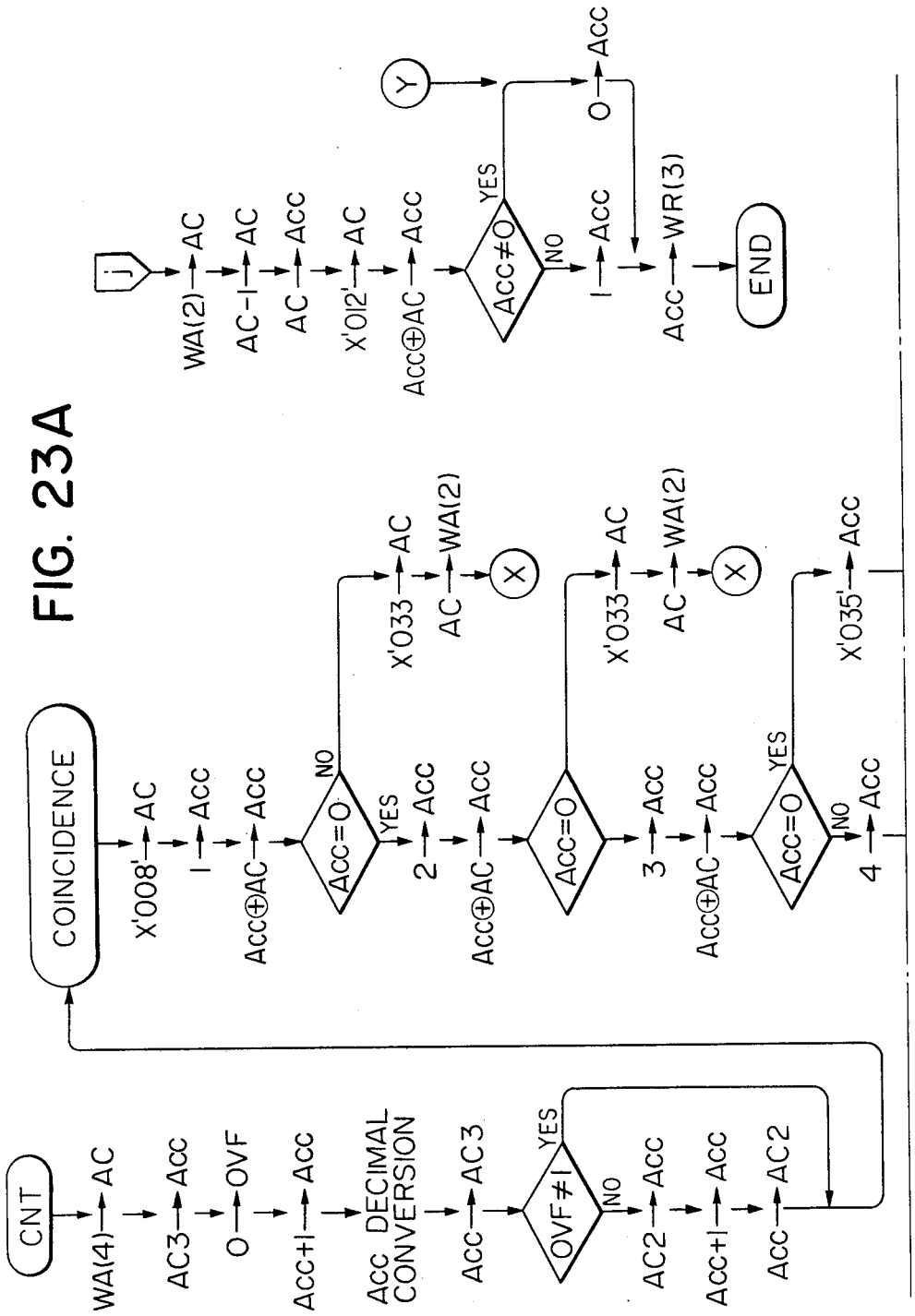
Figure 24A:
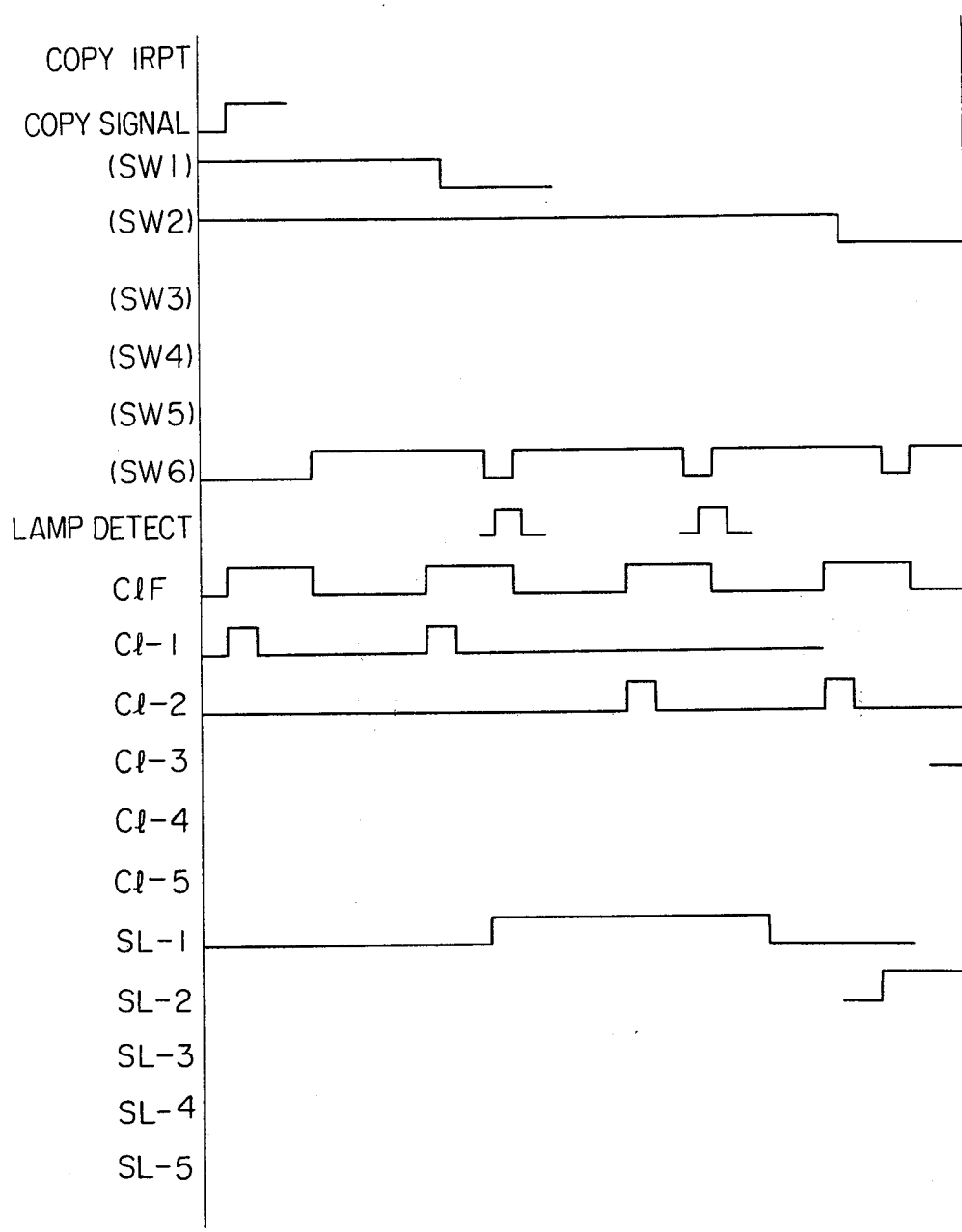
FIG. 24A and 24B is an external timing chart.
Figures 24, 24B:
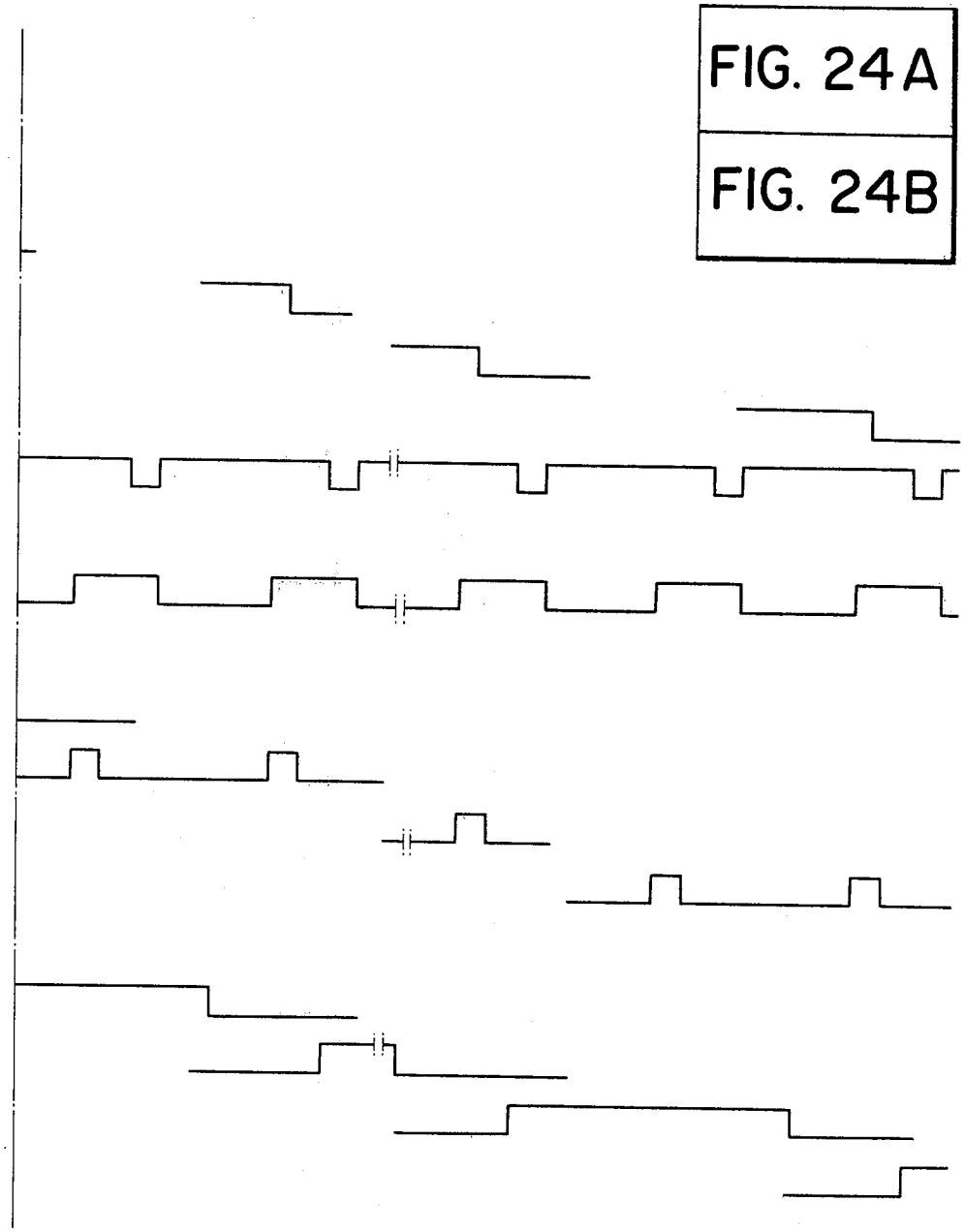

The abovementioned copy detection control is done by observing a signal input from the detecting means LD to be introduced into the terminal $I_1$ of the input-output unit I/O-1. In case of "1", it is understood that one sheet of copying has been completed. When the contents of the terminals $I_3$ to $I_0$ of the input-output unit I/O-1 are forwarded to the register Acc, and the contents of the register are subjected to the right shift for two times, the state of the terminal $I_1$ is set in the overflow bit OVF. If the contents are "OVF≠1", discrimination is effected as to whether the image originals are newly placed on the original mounting bins, or whether the key manipulation has been done, or not, and the display control of the contents of the addresses "X030" to "X039" of RAM is repeated until the data "1" emerges from the detecting means LD, as mentioned in the foregoing. When the data "1" appears at the terminal $I_1$ of the input-output unit I/O-1, the contents of the register Acc are revolved leftward (left shift for one time), and the state of the terminal $I_0$, to which an interruption signal sent from the reproduction apparatus is applied, is discriminated. If the data "1" is shown, it means that the interruption took place, and therefore this signal input can be introduced into the terminal $I_0$ of the input-output unit I/O-1 from the reproduction apparatus by depressing the copy button or the interruption demanding button of the reproduction apparatus, when it is desired that a single or a few copies are to be made urgently. When this is detected, the control unit holds this state until the interruption signal terminates, after which the step 11 begins. If no interruption signal enters, the copy sheet number counting operation and the set number of copy sheet are compared. Details of CNT are shown in FIG. 23. Explaining this CNT in reference to this drawing, the register WA(4) has already been cleared at the step 4, the data "0" in the lowest place of the register WA(4) is set in the register Acc through the register AC3, the addition of +1 to be the content of the register Acc is effected at ALU, the added result is stored in the register Acc, the content of the register Acc is subjected to the decimal correction at ALU, and the content of the register Acc is forwarded to AC3 of the register AC. Next, discrimination is effected as to whether the overflow bit OVF is "OVF≠1", or not. Since the overflow bit OVF is in "OVF≠1" at this stage, the content of the register WR(2) is taken out for obtaining the data of the addresses "X030" to "X039", where the copy sheet number setting data are stored. Thereafter, the content of the register WR(2) is examined to determine which one of the data "1" to "5" the content stands for. Since, at the present stage, the data "4" is in the WR(2), the data of the address "X037" enters into the register WA(2), and further into the register AC, whereby the data "3" stored in the address "X037" is led out into the register Acc. Next, the data in the lowest place in the register WA(4) is led out to be compared with the content of the register Acc. Since "Acc≠0" at the present stage, the data is forwarded to Ⓨ to clear the register Acc, and further clear the register WR(3), thereby terminating the control of CNT. Next, the content of the register WR(3) is transferred to the register Acc to perform judgement of "Acc=0". Since it is "yes" at this stage, the controls for the original detection, etc. in the step 9 are resumed. Since the copy start button is now kept in "on" state, the reproduction apparatus continues copying of the image original placed on the original mounting table. When the content of the lowest place of the register WA(4) becomes "3", the content of the address "X037" and the content of the lowest place of the register WA4 for the control of CNT are compared. Since, in this case, the compared result is not "Acc≠0", the data does not go to Ⓨ, but the address data of "X037" in the register WA(2) is changed to the address "X036", after which the content of the address "X036" and the address "X012" of the register WA(2) are compared. As the result of this comparison, since "Acc=1", the data "0" is stored in the register Acc, and the control procedures of the steps 9, 10 and 11 are again effected. When the data "23" is stored in the register WA(2), it coincides with the data "23" as stored in the addresses "X036" and "X037", so that the data "1" is set in the register Acc at the ultimate control of CNT, and such content is set in the register WR(3), which becomes NO by the last discrimination in the step 11 of whether it is "Acc=0", or not. Then, the step 12 controls are effected.

In the step 12, the driving means for the original conveying section 3 is operated by the action of the clutch cl-f for sending the data "0" for turning off the copy signal to the terminal O₀ of the input-output unit I/O-3, and for replacing the image original on the original mounting table of the reproduction apparatus 37 for the subsequent image original, whereby the image original starts movement. Next, in order to place the image original which have completed reproduction into the respective original receiving bins 64 to 60, the guide lever 65 and related parts are driven by the solenoids SL-1 to SL-5 to thereby forward the image originals into the original receiving bins 64 to 60. Incidentally, the solenoid SL-1 acts to the orignal receiving bin 64 and the solenoid SL-2 acts to the original receiving bin 63. Now, the solenoid SL-4 acts to the abovementioned original mounting bin 6 as the clutch cl-4 did thereto, whereby the previous image original is stored in the original receiving bin 61.

When the above operations are terminated, the step 13 control begins. That is, presence of the image original in the original mounting bin 6 is first confirmed by checking the terminals I₀, I₁, I₂ and I₃ of the input unit I/O-1 and the terminal I₃ of the input unit I/O-2. Since the image original is present in the original mounting bin 6 at this stage, the step 7 operations are resumed to commence the same operations as mentioned in the foregoing. When the copying operations for five sheets of the image originals in the original mounting bin 6 are completed, the step 14 control begins.

In the step 14, addition of −1 is effected to the content of the register WR(0), in which the number of the original mounting bins accommodating therein the image originals at this stage is stored. Since the data "2" is in the register WR(0) at this stage, its contents becomes "1". When the image originals accommodated in the original mounting bin 6 is exhausted, the data "23" displayed in the indicator DP4 is cleared, and the data "4" is taken out of the register WR(2) for changing the indication of the indicator to that of the initial state, i.e., "0F". Then, setting of the address code "X037" is effected using the "ADD" control, and the data "F" is introduced into the register WA(1) on the basis of the address "X037" to thereby change "X037" to "X036", and a control to introduce the data "0" into the address "X036" is effected. Subsequently, a control for subjecting the contents of the addresses "X020" to "X025" to the left shifting is effected, and finally a control for setting the data "0" into the address "X024" is effected. Thus, the step 14 controls are terminated.

In the subsequent step 15, there are effected a control for subjecting the contents of the addresses "X040" and "X041" to the left shift for 1 bit, and another control to the image original on the original mounting bin for the subsequent reproduction, in which the register WA4 for counting the number of copy sheet is reset, and, if the register WR(0) contains the data "0", the step 1 control is resumed; and if it does not contain the data "0", the step 6 control is resumed, since the image originals are present in any of the original mounting bins. In the above-described step 14, since the data "1" which means the original mounting bin 9 is set in the address "X020", the control to the original mounting bin 9 is effected as mentioned above. In the abovedescribed embodiment, "the number of copy sheet" has been exemplified as the condition for the copying operation. It should however be understood that the other conditions such as copying density, etc. can also be established in the same manner as described in the foregoing.

As described in the foregoing, since the automatic image original handling device according to the present invention automatically processes the reproduction copies in the order of the image originals placed on the original mounting bins and displays the state of the original mounting bins on the indicators, there is no necessity for those people who want to make copies to wait their turn in a queue.

Further, in the above-described embodiment, the reproduction apparatus functions to form a latent image, develop the latent image, and transfer the toner image onto the reproduction paper. However, when a different type of reproduction apparatus is used, in which a latent image is formed from an image original on a first photosensitive drum, then such latent image is transferred onto a second photosensitive drum to obtain a toner image, and this toner image is transferred to the reproduction paper, the copying time can be shortened. In addition, the copy counting operation becomes able to be done by detecting light from the exposure light source, whereby the feeding of the copy paper can be detected easily.

It should be added further that, in the above explanations, presence or absence of the image original has been detected by a detecting means provided on each original mounting bin; however, in place of such detecting mechanism, a different detecting device may be used, in which a plurality of keys for designating each of the original mounting bins are provided on the operating panel, and the designating key is operated when the image originals are placed on the original mounting bin so as to indicate the presence of the image originals in the respective original mounting bins. In this case, the quantity of the image originals should be input in the apparatus as is the case with the number of copy sheet in the above-described embodiment.

What we claim is

1. An automatic image original handling device comprising in combination:
    (a) a plurality of image original holding members capable of accommodating therein a plurality of image originals;
    (b) image original forwarding means for forwarding the image originals from the respective original holding members, one at a time;
    (c) image original conveying means for conveying the image originals, forwarded by the image original forwarding means, to an image exposure section;
    (d) a plurality of image original receiving members for receiving and storing the image originals forwarded and conveyed from the corresponding image original holding members; and
    (e) control means for controlling the image originals to be automatically and sequentially forwarded from the plurality of image original holding members so that after the last image original on an original holding member has been conveyed, the image original on the next subsequent original mounting member begins to be forwarded.

2. The automatic image original handling device as claimed in claim 1, further comprising detecting means for detecting the presence or absence of the image originals on said plurality of original holding members.

3. The automatic image original handling device as claimed in claim 2, further comprising indicating means for providing an indication, in response to detection by said detecting means, that an image original has been placed on the original holding member.

4. The automatic image original handling device as claimed in claims 2, wherein said indicating means indicates the order of placing of the image originals on said respective original holding members, in response to detection by said detecting means.

5. The automatic image original handling device as claimed in claim 2, further comprising setting means which establishes, in response to the detection by said detecting means, the reproduction operating conditions for copying the image originals placed in said respective original holding members.

6. The automatic image original handling device as claimed in claim 5, further comprising setting completion instruction means which provides an instruction upon completion of the reproduction operating conditions set by said setting means.

7. The automatic image original handling device as claimed in claim 6, further comprising means for advancing each said original, in response to said setting completion instruction means, in accordance with the reproduction operation conditions which have been set.

8. An automatic image original handling device which comprises in combination;
    (a) a plurality of original image holding members capable of supporting thereon a plurality of image originals;
    (b) an image original detecting member which detects image originals placed on each of said plurality of image original holding members;
    (c) means for setting reproduction producing conditions for said image originals placed on said plurality of original holding members;
    (d) memory means for storing each of the reproduction condition settings in response to detection of said image originals by said detecting member; and
    (e) reproduction control means for controlling movements of said image originals place on said plurality of original mounting member is accordance with the reproduction condition settings stored in said memory means.

9. An automatic image original handling device which comprises in combination;
    (a) a plurality of image original holding members capable of supporting thereon a plurality of image originals;
    (b) detecting means for detecting the order of placement of the originals placed on said plurality of original holding members;
    (c) placement order memory means for storing signals therein corresponding to the order of placement of the image originals;
    (d) imput means for introducing as an input signal the reproduction condition settings related to the image originals;
    (e) memory means for storing therein the reproduction condition settings introduced by said input means in response to the detection by said detecting means of the order of placement; and
    (f) reproduction control means which controls the movement of said image originals placed on said plurality if original holding members in accordance with the contents in said placement order memory means and said reproduction condition memory means.

10. The automatic image original handling device as claimed in claim 9, further comprising means for displaying the content of said reproduction condition memory means.

11. In a device having image original holding members capable of supporting thereon a plurality of image originals, and means for setting reproduction operating conditions related to movement of said plurality of image originals, and which effects reproduction of said plurality of image originals in accordance with the setting of the reproduction conditions, the improvement which comprises memory means for storing therein the reproduction conditions set for each of said plurality of image originals, and memory control means, operable while the reproduction operations are being conducted for one of said plurality of image originals, for controlling the storage of the reproduction condition settings for other originals in said memory.

12. The device as claimed in claim 11, further comprising means for displaying the contents of said memory means.

13. In a device having image original holding members capable of supporting thereon a plurality of image originals, and means for setting reproduction operating conditions for said plurality of image originals, and which effects reproduction of the image originals in accordance with the setting of the reproduction conditions, the improvement which comprises memory means for storing therein the reproduction conditions set for each of said plurality of image originals in response to said setting means, and clearing means for clearing each said reproduction condition setting upon completion of the reproduction operating conditions corresponding to that setting.

14. The device as claimed in claim 13, further comprising means for displaying the contents of said memory means.

15. In a device having a plurality of image original holding members capable of supporting thereon a plurality of image originals, and means for setting reproduction operating conditions for reproducing said plurality of image originals, and which performs reproduction operations to copy said plurality of image originals in accordance with the settings of reproduction conditions, the improvement which comprises processing order memory means which stores therein the processing order for each of the image originals in said plurality of original holding members, means for displaying the contents of said processing order memory means, and control means for controlling the reproduction operations with respect to each image original on said plurality of original holding members in response to the settings of reproduction conditions and the processing order stored in said processing order memory means.

16. In a device having means for setting reproduction conditions related to each of a plurality of originals, and which effects reproduction operations with respect to each of said plurality of originals in accordance with the settings of reproduction conditions, the improvement which comprises:

memory means having a plurality of memory locations for storing the reproduction condition settings respectively in said memory locations;

setting means for entering reproduction operation data into said memory means;

image forming means coupled to said memory means for effecting reproduction operations with respect to each of said plurality of originals in accordance with the settings of reproduction conditions stored in said memory means; and control means coupled to said setting means and said memory means for controlling said memory means such that while the reproduction operations are being conducted for a certain original in accordance with the associated reproduction condition stored in one of the memory locations of said memory means, said memory means stores in its subsequent empty memory locations other reproduction conditions which are related to other originals and entered by said setting means.

17. The device as claimed in claim 16, further comprising means for displaying the contents stored in said plurality of memory locations in said memory means.

18. A device according to claim 17, wherein said display means comprises display elements which correspond in number to the memory locations.

19. A device according to claim 17, further comprising a third control means for controlling said memory means such that after completion of the reproduction operation in accordance with the reproduction condition stored in said one of memory location of said memory means, said memory means stores in its same memory location a new reproduction condition entered by said setting means.

20. A device according to claim 16, further comprising a second control means for controlling said image forming means to automatically indicate the reproduction operations with respect to the other originals in accordance with the other reproduction conditions stored in said memory after termination of the reproduction operation with respect to the previous original.

21. A device according to claim 16, wherein said setting means has numerical keys for entering numerical information.

22. In a device having means for setting reproduction conditions related to each of a plurality of originals, and which conducts reproduction operations with respect to each of said plurality of originals in accordance with the setting of reproduction conditions, the improvement comprising:

processing order memory means for storing the processing order of reproduction operations with respect to each of said plurality of originals; and display means coupled to said memory means for displaying the processing order of reproduction operations stored in said memory.

23. A device according to claim 22, further comprising control means for controlling said memory means such that when the reproduction operation of the most significant processing order stored in said memory means is completed, said memory means shifts up one by one through the processing order of the remaining originals stored therein.

24. A device according to claim 22, further comprising control means for controlling said memory means to store the processing order of reproduction operations with respect to the originals in accordance with the setting operation order of said setting means.

25. A device according to claim 22, further comprising control means for controlling said memory means such that when the reproduction operation of the most significant processing order stored in said memory means is completed, said memory means shifts up one by one through the processing order of the remaining originals stored therein.

26. A device according to claim 22, further comprising control means for controlling said memory means to store the processing order of reproduction operations with respect to the originals in accordance with the setting operation order of said setting means.

* * * * *

UNITED STATES PATENT AND TRADEMARK OFFICE
CERTIFICATE OF CORRECTION

PATENT NO. : 4,248,529

DATED : February 3, 1981

INVENTOR(S) : TADASHI SATO, ET AL.

It is certified that error appears in the above-identified patent and that said Letters Patent are hereby corrected as shown below:

Column 1

Line 34, change "sheet" to read --sheets--.

Line 38, change "these" to read --those--;

after "want" insert --to--;

change "should" to read --may--.

Line 39, change "waited" to read --waiting--.

Line 66, change "this" to read --the--.

Column 2

Line 3, change "sheet, etc." to read --sheets, etc.--.

Line 13, change "sheet per" to read --sheets per--.

Column 3

Line 57, change "are" to read --as--.

UNITED STATES PATENT AND TRADEMARK OFFICE
CERTIFICATE OF CORRECTION

PATENT NO. : 4,248,529

DATED : February 3, 1981

INVENTOR(S) : TADASHI SATO, ET AL.

It is certified that error appears in the above-identified patent and that said Letters Patent are hereby corrected as shown below:

Column 5

Line 8, after "61," insert --62,--.

Line 21, change "and" to read --end--.

Line 56, change "constitute" to read --constitutes--.

Column 6

Line 46, change "operation" to read --operations--.

Line 67, change "sheet" to read --sheets--.

Column 7

Line 43, change "drives the" to read --drives and--.

Line 44, change "guide" to read --guides--;

change "bias" to read --bins--.

Column 8

Line 10, after "addition," insert --and--.

Lines 23 and 26, change "in some occasion" to read

--on some occasions--.

UNITED STATES PATENT AND TRADEMARK OFFICE
CERTIFICATE OF CORRECTION

PATENT NO. : 4,248,529

DATED : February 3, 1981

INVENTOR(S) : TADASHI SATO, ET AL.

It is certified that error appears in the above-identified patent and that said Letters Patent are hereby corrected as shown below:

Column 10

Line 49, delete "41" and insert --"--.

Line 53, before "Acc" delete "to"

Line 64, change "011" to read --1011--.

Column 13

Line 30, change " $\oplus$ Acc" to read -- $\oplus$ Ac → Acc--.

Line 42, change "AO" to read --Ac--.

Column 14

Line 14, change "in" to read --is--.

UNITED STATES PATENT AND TRADEMARK OFFICE
CERTIFICATE OF CORRECTION

PATENT NO. : 4,248,529

DATED : February 3, 1981

INVENTOR(S) : TADASHI SATO, ET AL.

It is certified that error appears in the above-identified patent and that said Letters Patent are hereby corrected as shown below:

Column 17

Line 29, change "00" to read --100--.

IN THE CLAIMS

CLAIM 4

Line 2, change "claims" to read --claim--.

CLAIM 8

Line 17, change "is" to read --in--.

Signed and Sealed this

Thirteenth Day of October 1981

[SEAL]

Attest:

GERALD J. MOSSINGHOFF

Attesting Officer    Commissioner of Patents and Trademarks